United States Patent [19]
Leasor et al.

[11] Patent Number: 6,000,502
[45] Date of Patent: Dec. 14, 1999

[54] PERSONNEL CARRYING VEHICLE

[75] Inventors: Paul J. Leasor, St. Marys; Harold A. Stammen, New Bremen, both of Ohio

[73] Assignee: Crown Equipment Corporation, New Bremen, Ohio

[21] Appl. No.: 09/060,661

[22] Filed: Apr. 15, 1998

Related U.S. Application Data

[62] Division of application No. 08/725,975, Oct. 4, 1996
[60] Provisional application No. 60/025,970, Sep. 9, 1996.

[51] Int. Cl.[6] .................................................. B66F 9/06
[52] U.S. Cl. .................................... 187/222; 180/401
[58] Field of Search ................................. 187/222, 231, 187/233, 232; 182/141, 148, 63; 180/401, 167, 168; 104/247, 242, 245, 246

[56] References Cited

U.S. PATENT DOCUMENTS

| | | | |
|---|---|---|---|
| D. 347,720 | 6/1994 | Tamura et al. | D34/34 |
| 4,261,265 | 4/1981 | Bertelsbeck | 180/401 |
| 5,174,415 | 12/1992 | Neagle | 187/9 R |
| 5,203,425 | 4/1993 | Wehmeyer | 182/19 |
| 5,273,132 | 12/1993 | Sasaki et al. | 182/148 |

*Primary Examiner*—Kenneth Noland
*Attorney, Agent, or Firm*—Killworth, Gottman, Hagan & Schaeff, L.L.P.

[57] ABSTRACT

An apparatus and method are provided for guiding a personnel carrying vehicle including a body with a pair of driven rear wheels and a pair of front caster wheels into a narrow aisle. A pair of guide rollers are mounted on each side of the vehicle and spaced between the front caster wheels and the driven rear wheels. A steering rail extends between the pair of guide rollers on each side of the vehicle and is curved inwardly towards the body. A guide rail is placed on each side of the narrow aisle for engaging the vehicle mounted rollers with the guide rails terminating in entry ends which engage the steering rails for entry of the vehicle into the narrow aisle. The vehicle is steered forward toward an aisle entrance to cause one of the forward guide rollers to engage one of the guide rails and one of the aisle entry ends to engage one of the steering rails. Continuing forward movement of the vehicle causes the vehicle to rotate about the engaged aisle entry end to align the vehicle within the aisle. Aisle rollers may be placed at the entry ends of the guide rails for engaging the vehicle mounted steering rails.

4 Claims, 24 Drawing Sheets

Fig. 12
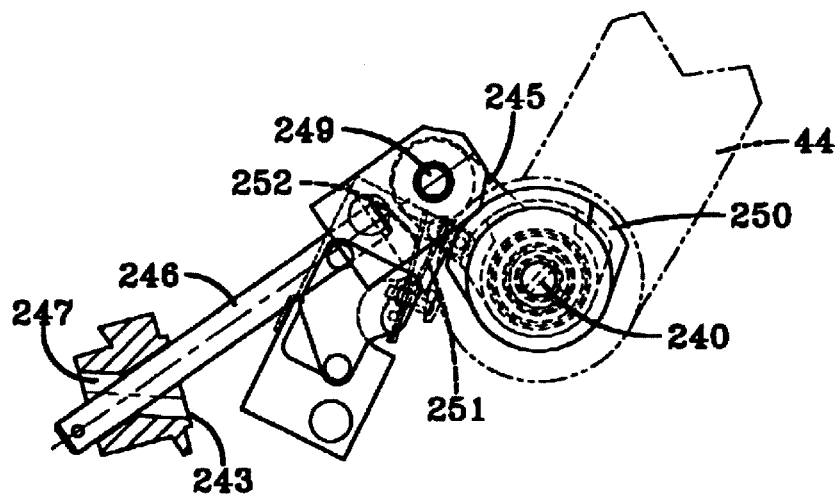
Fig. 13
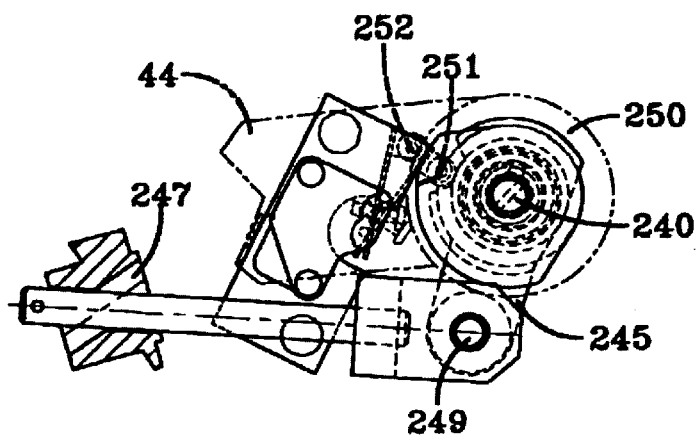

PERSONNEL CARRYING VEHICLE

RELATED APPLICATIONS

This application is a division of application Ser. No. 08/725,975, filed Oct. 4, 1996, pending. Applicants claim benefit of earlier filed United States Provisional Patent Application Ser. No. 60/025,970, filed Sep. 9, 1996.

BACKGROUND OF THE INVENTION

This invention relates to an electric powered personnel carrying vehicle that is particularly useful in transporting small items retrieved from shelves in a warehouse, or as a work platform which allows an operator to be raised approximately six feet or more into the air.

Small parts picking is currently done by personnel manually pushing carts equipped with several shelves and a low level ladder which the operator climbs for reaching stock items up to nine feet high. Higher elevation picking up to 12 feet is accomplished with large manual push-in-place mobile ladder stands. Each require the operator to climb up and down while manually holding the goods.

Self-propelled elevating work platforms presently offered to the user are typically large in size, move slowly, have poor travel and controls and are not ergonomically well designed for tasks other than elevating personnel to do elevated maintenance and construction work.

Industrial order picker lift trucks are designed to elevate an operator on a control platform and goods on a pallet carried by the forks of the vehicle. A load platform in place of forks is also available. All units are designed for carrying heavier loads typical to pallet unit size. This requires these vehicles to be large in size and incapable of use in typical small parts storage areas.

SUMMARY OF THE INVENTION

The present invention is a multi-task capable work assist vehicle designed for transporting and elevating an operator with goods or equipment. Its uses include orderpicking, in-house service maintenance and cargo delivery. It is designed to be compact in size, highly maneuverable for use in narrow storage aisles and tight quarters. Operator controls are designed for efficient use. Guarding and control interlocks are provided to assist operator safety.

The personnel carrying vehicle of the present invention comprises a self-propelled, steerable body, a telescoping mast attached to and extending upwardly from the body, and a personnel compartment attached to the mast and provided with a rail member that extends from the mast and around the sides. A pair of gate members, which are pivotally attached to the rail member and to the floor of the compartment, are movable from a closed position to an open position wherein the gate members extend into the compartment. The mast extends upwardly and forwardly of the body at an angle of approximately five degrees to the top of the rail; this provides the operator with unobstructed access to anything above the top edge of the rail, and the forward tilt of the mast enlarges the upper portion of the compartment, near the waist of the operator, thus accommodating the operator comfortably without increasing the length of the vehicle; it also causes the center of gravity of the vehicle to move forward, toward the center of the vehicle, as the compartment is raised. The vehicle is driven by electric motors which are located under the operator compartment and attached to the drive wheels through a gear train to permit the floor of the compartment to be positioned as close to the ground level as possible. Control handles are mounted within the personnel compartment. In the preferred embodiment, the left handle controls steering and the right handle controls traction. Sensors ensure the operator's hands are on both control handles and both feet are properly positioned on the floor before the vehicle can be moved or the platform raised; this ensures a four point stance, providing for operator stability and that the operator's hands and feet are within the operator's compartment anytime the vehicle is being moved or during lifting or lowering operations. Gate interlock switches are provided to restrict or prevent travel of the vehicle under certain conditions. A load deck is provided on the body of the vehicle on the opposite side of the mast from the personnel compartment. Also, a load tray may be mounted to the telescoping mast to move vertically with the compartment. Rail guides may be mounted to the outside of the vehicle to facilitate entry into and operations within narrow aisles.

It is therefore an object of this invention to provide a personnel carrying vehicle comprising a self propelled, steerable body, a mast attached to and extending upwardly from the body, and a personnel compartment attached to the mast, the personnel compartment including a floor component mounted to the mast, a rail member mounted to the mast, the rail member extending around the sides and front of the vehicle, and a pair of gate members pivotally attached to the rail member and to the floor component and movable from a closed position to an open position wherein the gate members extend into the personnel compartment.

It is a further object of this invention to provide a self powered personnel lifting device including a base member including wheels at the corners thereof, a telescoping mast mounted on the base member toward one end thereof and extending upwardly at an angle of approximately 5°, an operator's compartment, the compartment including a floor, and a rail at approximately waist level around the operator's compartment attached to the telescoping mast with the mast not higher than the rail, means for extending the mast, and the operator's compartment upward from the base member.

It is a still further object of this invention to provide a steering control for a personnel carrying vehicle comprising a fixed grip for receiving a hand of an operator, a rocker mechanism rotatably mounted in the grip from a center position to either a first position or a second position, biasing means for urging the rocker mechanism to obtain the center position, and means responsive to the position of the rocker for providing an electrical control signal indicating direction of steering.

It is another object of this invention to provide a personnel carrying vehicle comprising a body including a first pair of wheels and a second pair of wheels, means for individually powering the first pair of wheels, an operator's compartment mounted on the body, a pair of handles mounted in the compartment, the handles being positioned at approximately waist height and oriented generally horizontally, with a first handle placed for grasping by one of the operator's hands and the other handle placed for grasping by the other hand, the first handle being rotatable for controlling the speed of the vehicle in the forward and reverse direction, and the second handle provided with means operated by the operator's fingers for controlling the steering of the vehicle.

It is further object of this invention to provide a method and apparatus for guiding a vehicle into a narrow aisle wherein the vehicle is provided with a pair of driven rear wheels, a pair of front caster wheels, a pair or guide rollers mounted on each side of the vehicle between the wheels, a steering rail mounted on each side of the vehicle between the guide rollers, and wherein the aisle is provided with a guide rail extending the length of the aisle and rollers placed at the entry end of each aisle, the method including the steps of steering the vehicle toward the aisle entrance to cause one of the forward vehicle mounted guide rollers to engage the guide rail and the aisle roller to engage the steering rail, and continuing forward movement of the vehicle to cause the vehicle to rotate about the aisle roller to align the vehicle within the aisle.

It is a still further object of this invention to provide a control system for a personnel carrying vehicle which includes an operator's compartment provided with a floor, and a pair of handles positioned at approximately waist height and oriented generally horizontally, with a first handle placed for grasping by the operator's right hand and a second handle placed for grasping by the operator's left hand, means for moving and steering the vehicle, means for lifting and lowering the operator's compartment relative to the remainder of the vehicle, the right hand handle being rotatable for controlling the speed of the vehicle in the forward and reverse direction, and the left hand handle provided with means operated by the operator's fingers for controlling the steering of the vehicle, sensing means for detecting the presence of the operator's hands on the handles, the sensing means includes infrared light sources and detectors located adjacent the right and left hand handles, and fast operated switches for controlling a pair of spaced-apart switches mounted in the floor of the compartment, circuit means responsive to the sensing means for inhibiting raising, lowering, steering or movement of the vehicle if the operator's hands are not on the handles and the operator's feet are not on the floor mounted switches.

Other objects and advantages of the invention will be apparent from the following description, the accompanying drawings and the appended claims.

BRIEF DESCRIPTION OF THE DRAWINGS

FIG. 12 is a plan view of a spring biased gate hinge mechanism showing a gate in the closed position;

FIG. 13 is a plan view of a gate hinge mechanism showing a gate in the open position;

DESCRIPTION OF THE PREFERRED EMBODIMENT

Figure 1:
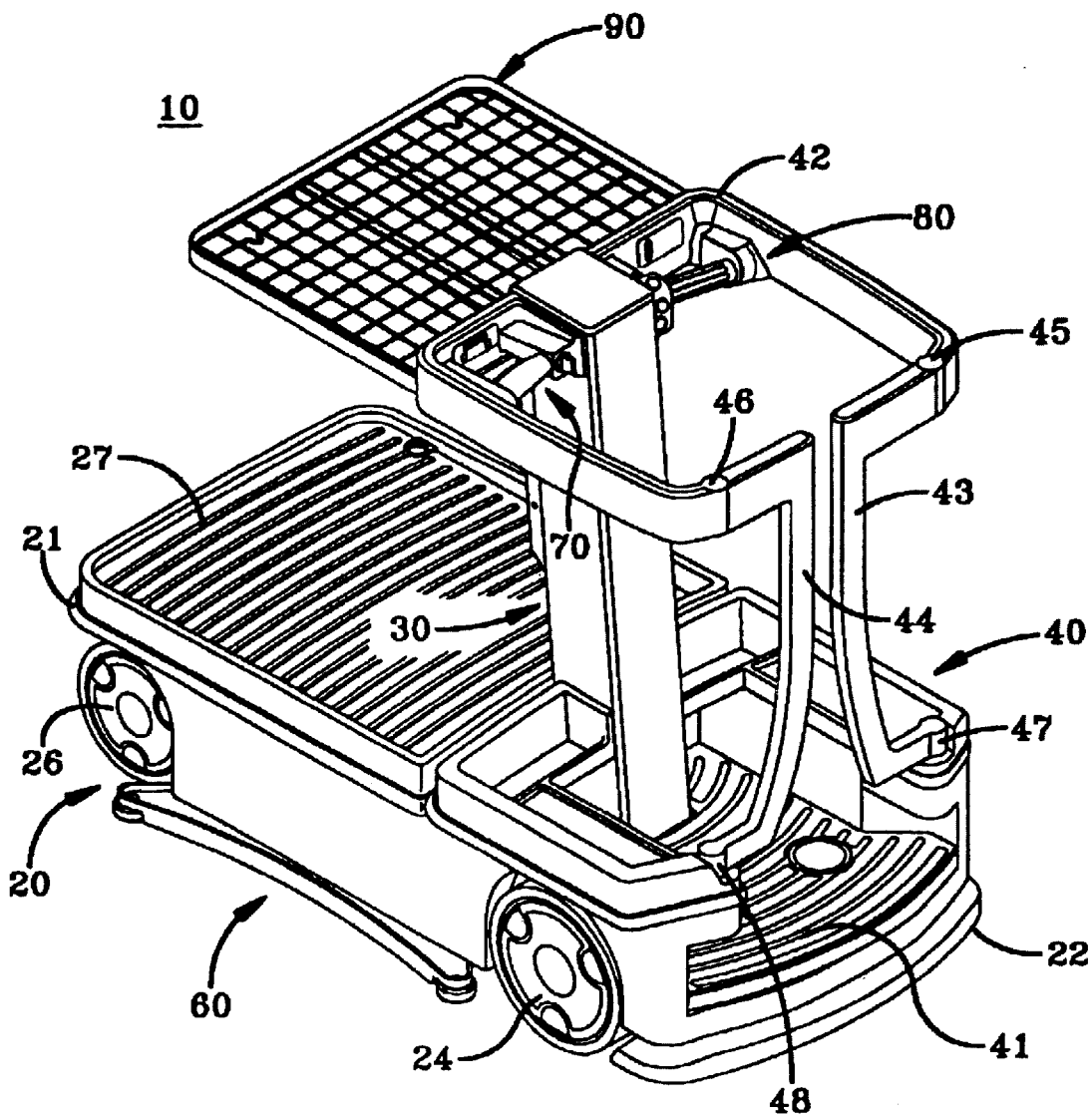
FIG. 1 is a perspective view of a personnel carrying vehicle of the present invention.

Referring now to FIGS. 1–5, a personnel carrying vehicle 10 includes a self-propelled, steerable body 20 having a front 21 and a rear 22. A pair of drive wheels 24 are mounted near the rear of the body, and a pair of caster wheels 26 are mounted near the front of the body. A load deck or platform 27 is removably placed at the forward end of the vehicle.

Figure 2:
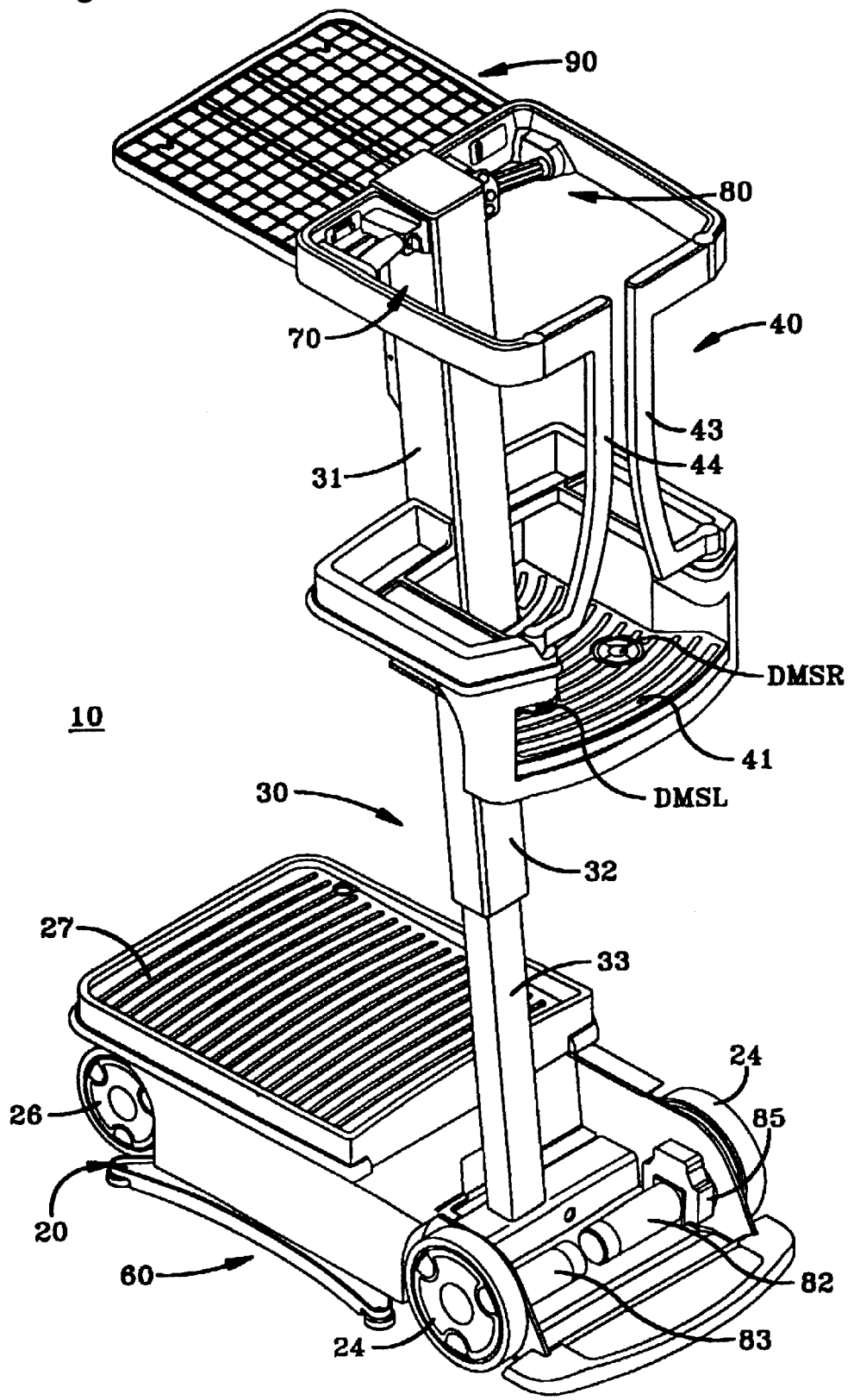
FIG. 2 is a perspective view of the vehicle of FIG. 1 with the operator's platform or compartment in the raised position.
Figure 5:
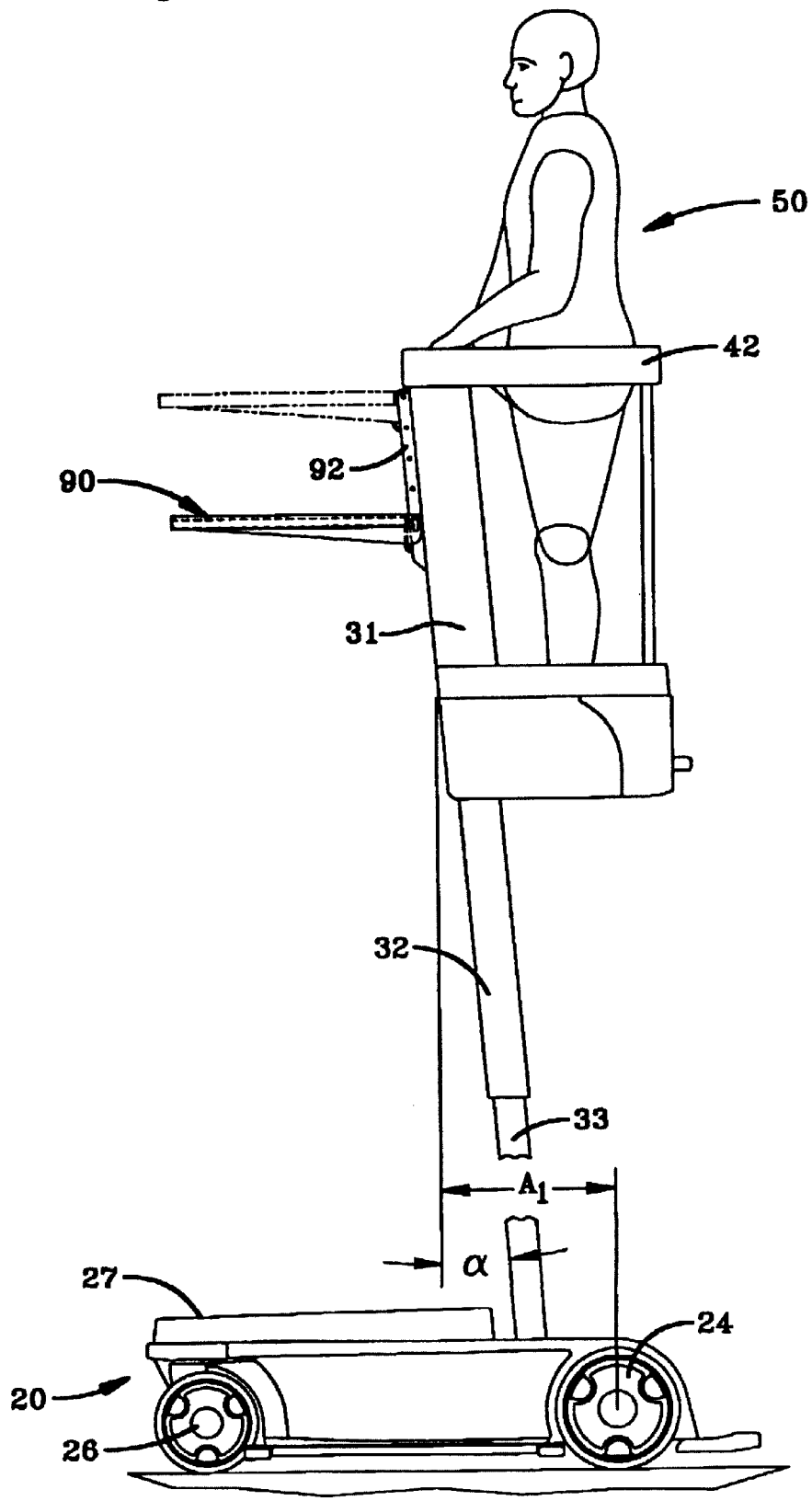
FIG. 5 is a side elevational view of the vehicle with the platform raised, as shown in FIG. 2.
Figure 6:
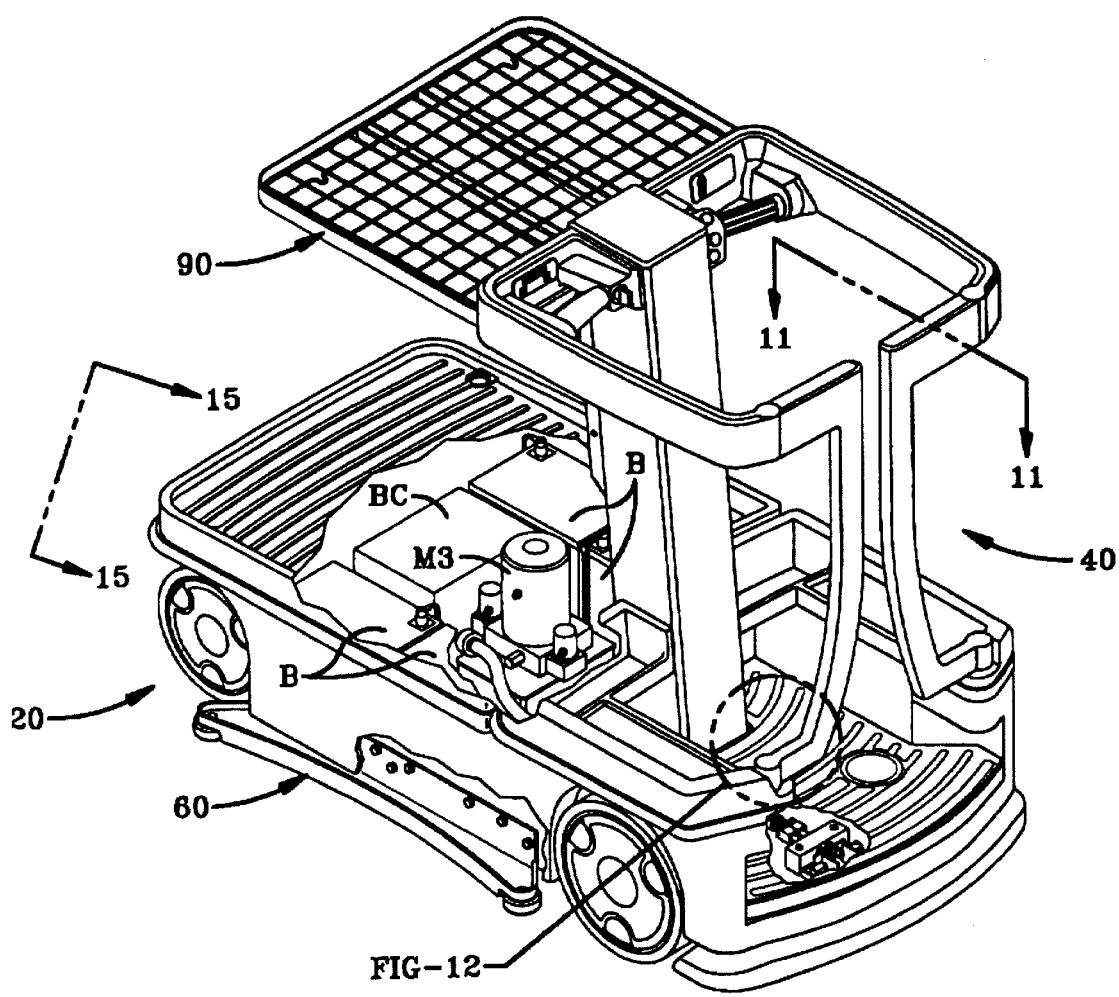
FIG. 6 is a perspective view of the vehicle of FIG. 1 with the load platform and rear deck partially cut away to reveal various components therebelow.

A mast 30 is attached to and extends upwardly from the body 20. As shown in FIG. 2, the mast 30 includes three nested sections 31, 32, and 33. A hydraulic cylinder is employed to extend the mast from its retracted position, shown in FIG. 1, to its fully extended position as shown in FIGS. 2 and 5. While three mast sections are illustrated, the number of mast sections actually used can vary.

A personnel compartment 40 is attached to the mast 30, and specifically to the outer or upper section 31. The personnel compartment includes a floor 41 removably attached to the mast, a rail member 42 mounted to the mast and extending around the sides and front of the personnel compartment, and a pair of gate members 43 and 44 pivotally attached to the rail member 42 at 45 and 46, respectively, and to the floor at 47 and 48, respectively. The floor is hinged at the front of the compartment to permit access to the electric motors and other equipment beneath the floor without requiring the compartment 40 to be raised. The gate members are movable from a closed position, as shown in FIG. 1, to an open position wherein the gate members extend into the personnel compartment 40.

As shown in FIGS. 1–3 and 5, the rail member 42, as well as the top of the mast 30, is placed at approximately waist height of an operator 50 (FIG. 3) standing within the personnel compartment 40. The mast 30 does not extend substantially above the rail 42, thus giving the operator 50 unobstructed access to anything above the top edge of the rail.

As shown in FIG. 5, the lower mast member 33 is attached to the body 20 and extends upwardly and forward of the vehicle at an angle α of approximately 5° from the vertical. As the mast is extended, the personnel compartment is moved upwardly and forwardly.

The personnel or operator's compartment 40 benefits by the 5° tilt of the mast in that the upper portion of the compartment, near the waist of the operator, is larger than the floor, thus accommodating the operator comfortably without increasing the length of the vehicle.

Referring again to FIG. 1, a detachable rail guide assembly 60 is mounted on the body 20 between the front and rear wheels. A rail guide assembly is mounted on each side of the vehicle and is used to assist in guiding the vehicle into an aisle between closely spaced storage racks, as will be explained later.

The operator 50 is provided with a pair of control handles, a steering control assembly 70 and a traction control assembly 80. When the vehicle is in operation, the operator must have one hand (the left hand as shown in FIG. 1) on the steering control, and the other hand (the right hand, as shown) on the traction control, and both feet on the floor of the operator's compartment, and specifically on dead man switches DMSL and DMSR, shown in FIG. 11. This ensures a four point stance, providing for operator stability and that the operator's hands and feet are within the operator's compartment anytime the vehicle is being moved or during lifting or lowering operations.

To insure the operator's hands are on the steering control, optical switches LHS and RHS are employed. In the preferred embodiment of this invention, the optical switches include infrared transmitters IRT mounted to project an light beam to the optical switches LHS, RHS that will be interrupted only when the hand is on the steering control. See FIGS. 19 and 20. Circuit means are provided to prevent the optical switches from being taped over to simulate the presence of a hand; specifically, a timer circuit is provided to sense the opening of the floor switches, which would occur when an operator leaves the compartment, and thereafter inhibits operation of the vehicle if the optical switches do not observe the removal of a hand within a predetermined amount of time.

Referring to FIG. 2, a pair of traction motors 82 and 83 are mounted in a traction motor compartment located inside the body 20 and beneath the floor 41 of the operator's compartment. A cover plate, which normally encloses the traction motor compartment, has been removed to reveal the contents of the compartment. The traction motors are connected to the axle of wheels 24 through a gear box 85. As shown in FIG. 2, the center axis of each traction motor is below the axis of the wheels, thus permitting the floor 41 of the compartment 40 to be positioned as close to the ground level as possible, at a height H, approximately 7 inches above the floor F.

Figure 3:
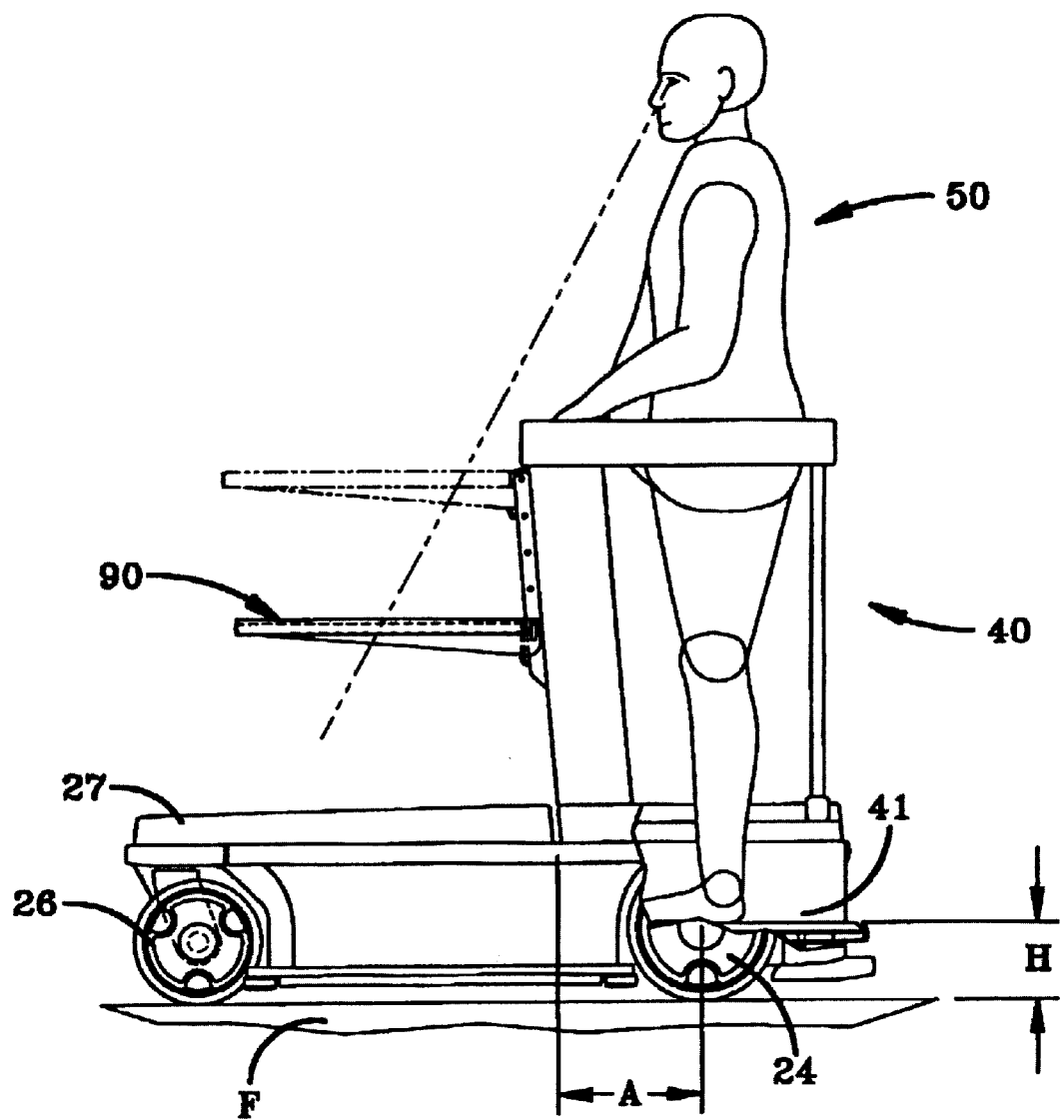
FIG. 3 is a side elevational view of the vehicle of FIG. 1.
Figure 4:
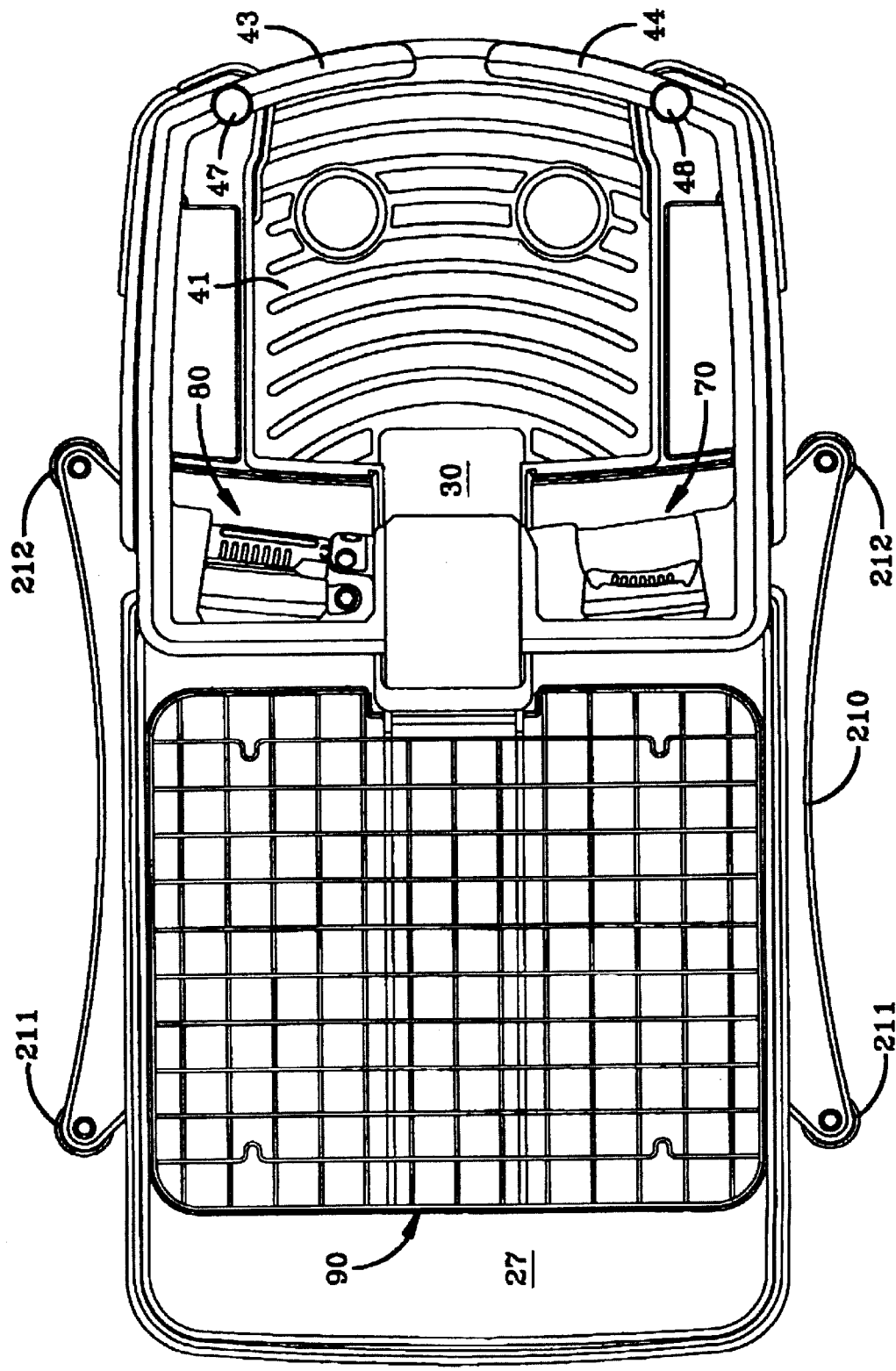
FIG. 4 is a plan view of the vehicle shown in FIG. 1.

Referring to FIGS. 3–5, a load tray 90 may also be mounted on the mast 30. An attachment strip 92 extends downwardly from the top of the upper mast section 31 and is provided with spaced apart pin openings which permit easy attachment of the load tray 90 at different levels relative to the upper rail 42. The load tray may take various configurations.

The basic load tray 90 includes outside or peripheral members and a plurality of interior wires 93. Generally, the interior wires 93 are designed to help support the load while at the same time, they are arranged to facilitate the operator's view of any material on the load platform 27.

The attachment of the load tray to the mast permits the load tray to pivot upwardly if it is inadvertently lowered onto an obstacle which has been placed on the load platform.

Referring to FIGS. 5, the mast assembly 30 includes three mast sections 31, 32, and 33. Mast section 33 is welded to the body 20 and extends upwardly toward the front of the vehicle at a 5° angle. A hydraulic cylinder (not shown) located within mast assembly 30 may be extended to move the operator's compartment or platform to a maximum height of approximately 77 inches above the floor.

Figure 7:
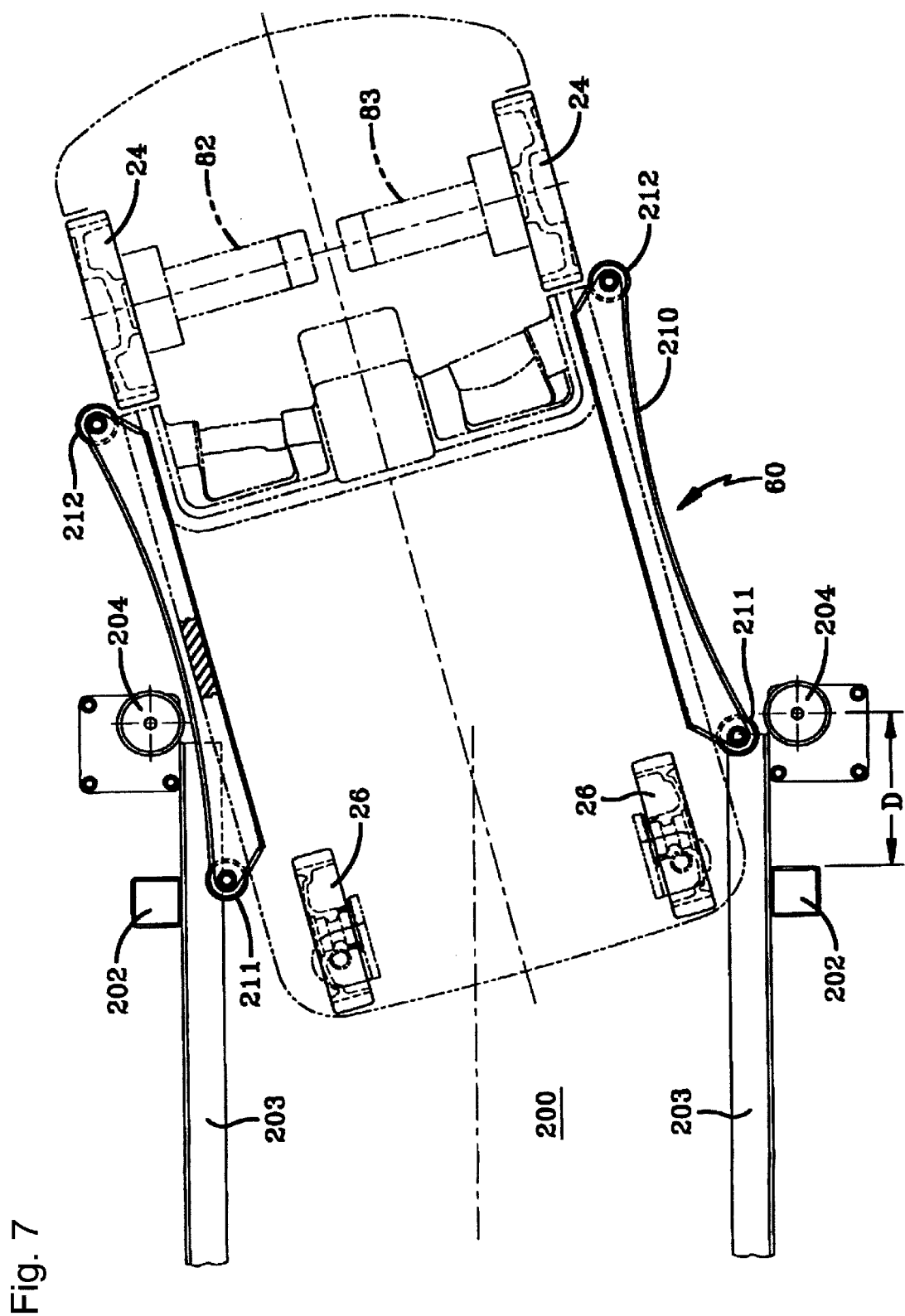
FIG. 7 is a plan view of a vehicle, which is equipped with a rail guide assembly to facilitate the vehicle's entering into a narrow aisle, with the vehicle approaching an aisle at an angle to the center line of the aisle.

The vehicle shown in FIGS. 1, and 6–9 is provided with a rail guide assembly 60 to assist the vehicle as it approaches and enters a narrow aisle 200. A rail guide assembly is attached to each side of the vehicle between the front and rear wheels. Each rail guide assembly 60, shown in FIG. 7, includes a curved rail 210 provided with a roller 211 at the forward end and a roller 212 at the rear thereof. In FIG. 7, which is a plan view showing a vehicle as it approaches an aisle 200, the aisle is defined by racks, vertical columns 202 of which are shown. At the floor level, L-shaped rails 203 are installed, the vertical component of which is high enough that it will engage rollers 211, 212 on the rail assembly. An entry roller 204 is positioned beyond the end of each aisle a sufficient distance D to prevent the end of the truck from striking the rack vertical columns 202 as the truck approaches the aisle entrance 200. A leading roller 211 will engage the aisle entry roller 204 or L-shaped rails 203 and roll along the rails 203. With the vehicle having caster front wheels 26, the caster wheels will follow the alignment of the guidance rails 203.

Figure 8:
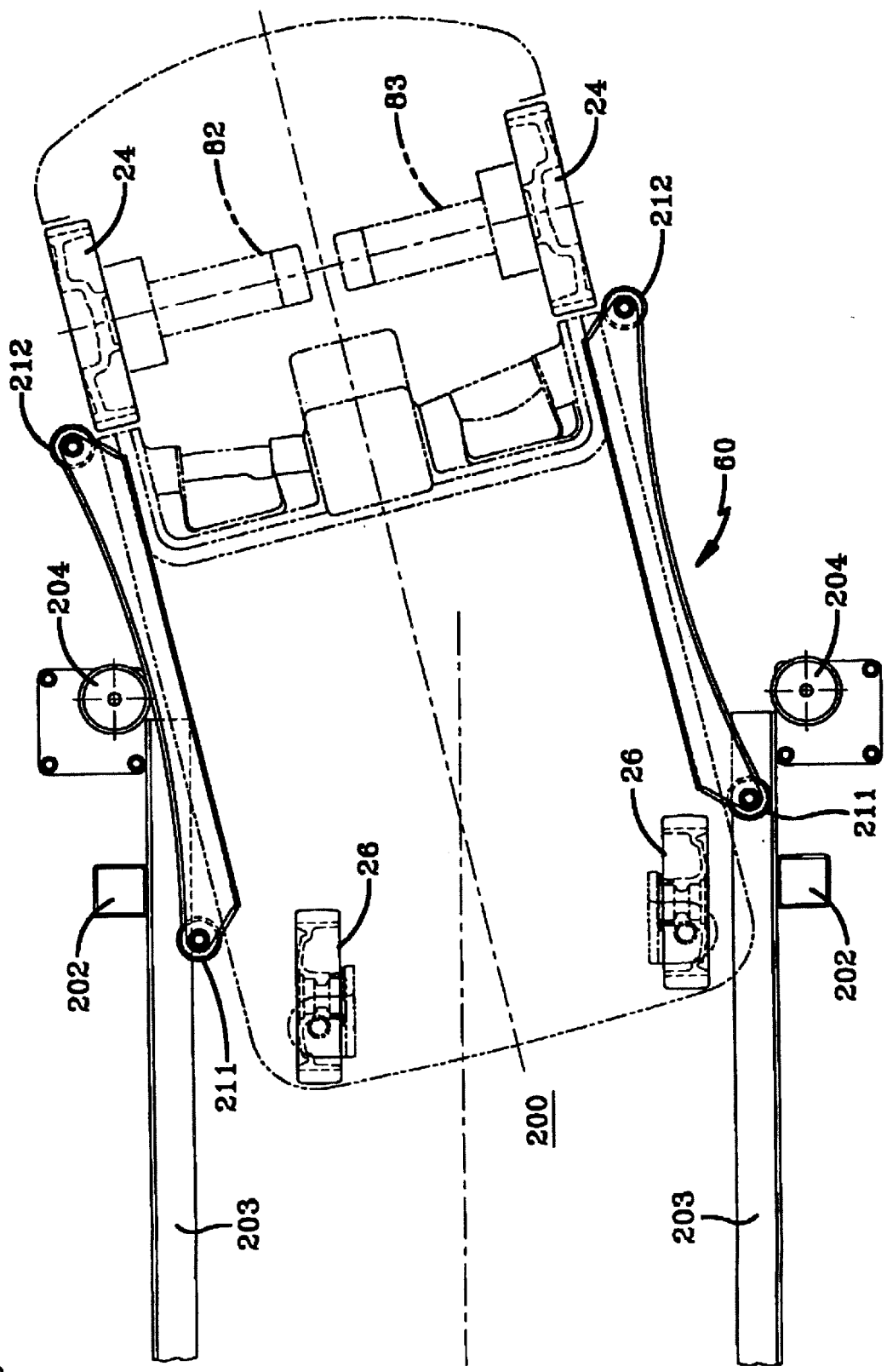
FIG. 8 is a plan view similar to FIG. 7 but with the vehicle entering into the aisle.
Figure 10:
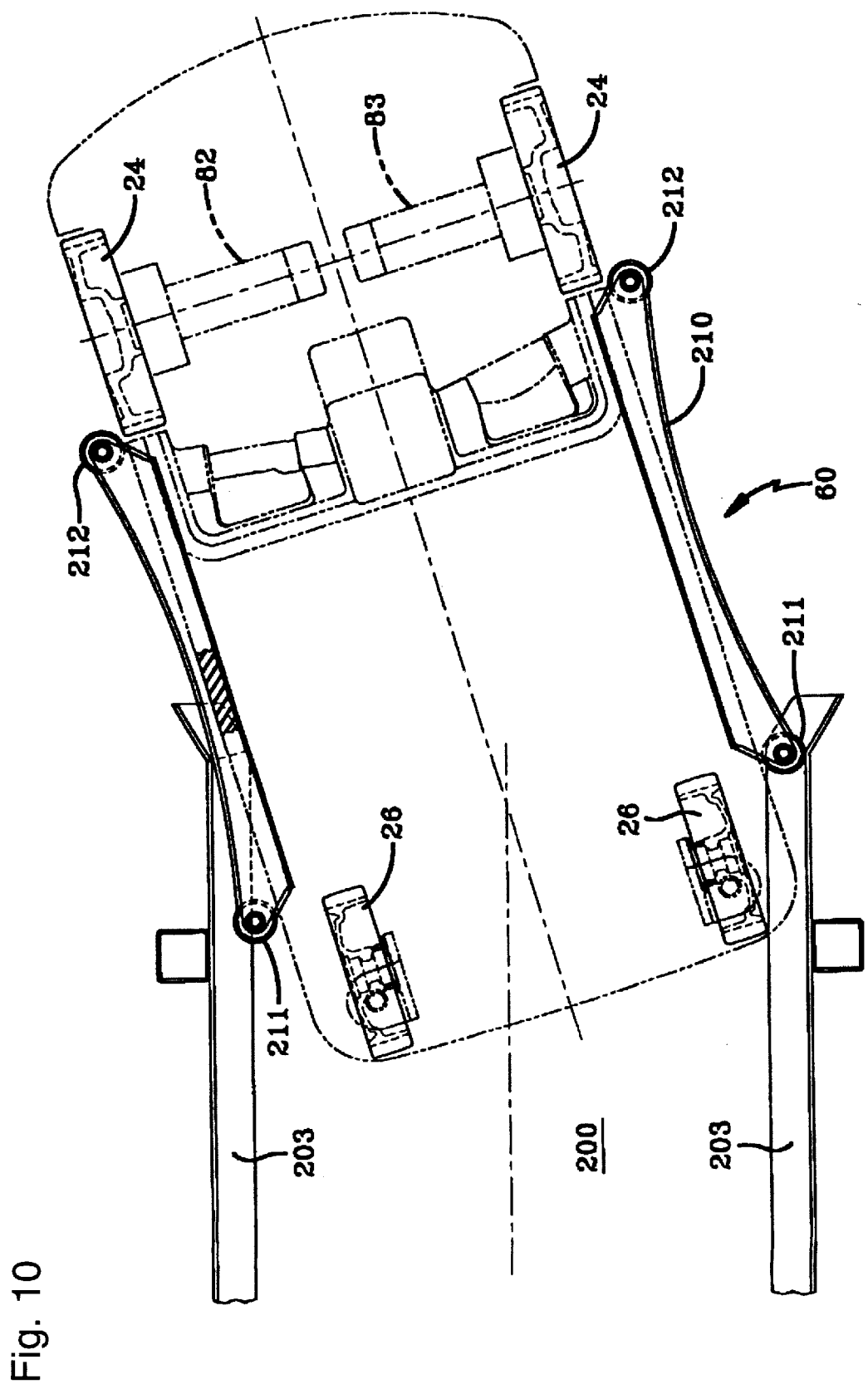
FIG. 10 is a plan view of the vehicle of the present invention entering an aisle with conventional guide rails.

It is noted in FIG. 8, the rail 210 is curved or scalloped, and as the vehicle 10 which is not perfectly aligned to the aisle continues into aisle 200, the aisle entry roller 204 will contact the curved rail 210 and force the rear end of the truck to become aligned with aisle 200. The curved or scalloped shape of rail 210 allows deeper penetration and better alignment of the truck into the aisle before entry roller 204 forces the rear of the truck into final alignment. Instead of an entry roller, the end of the aisle may be provided with a more conventional tapered or beveled entry rails to facilitate alignment of the vehicle, as shown in FIG. 10. This, of course, is a sliding metal to metal contact which requires more force to align the rear of the truck than the rolling action of entry roller 204 requires.

Figure 9:
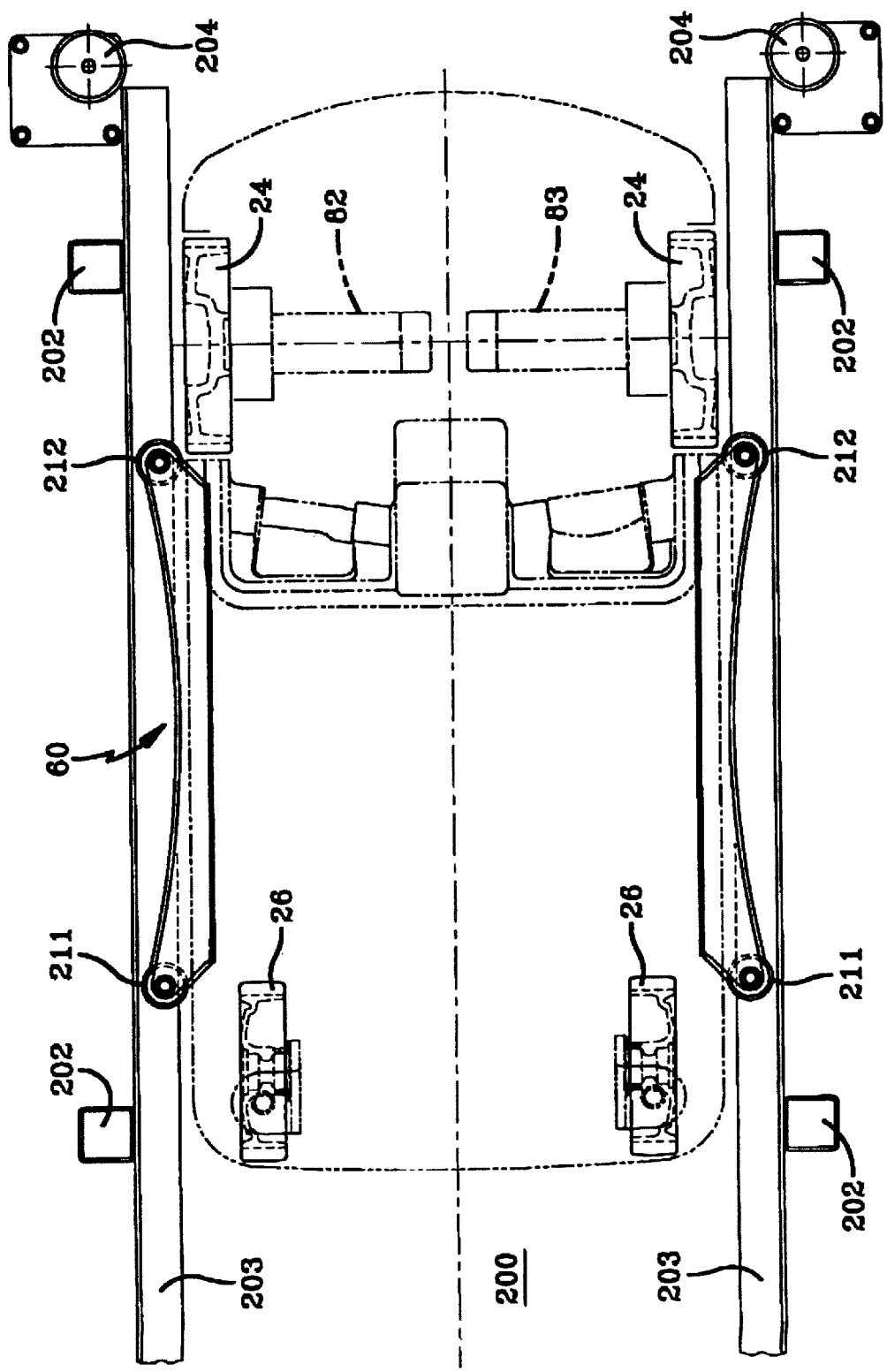
FIG. 9 is a plan view similar to FIG. 7 with the vehicle in the aisle.

As shown in FIG. 9, the vehicle will eventually become aligned with both rollers 211, 212 engaging the vertical section of the rails 203 on one side or the other. Typically, there is only ½ inch total clearance between rollers 211, 212 and rails 203.

Figure 11:
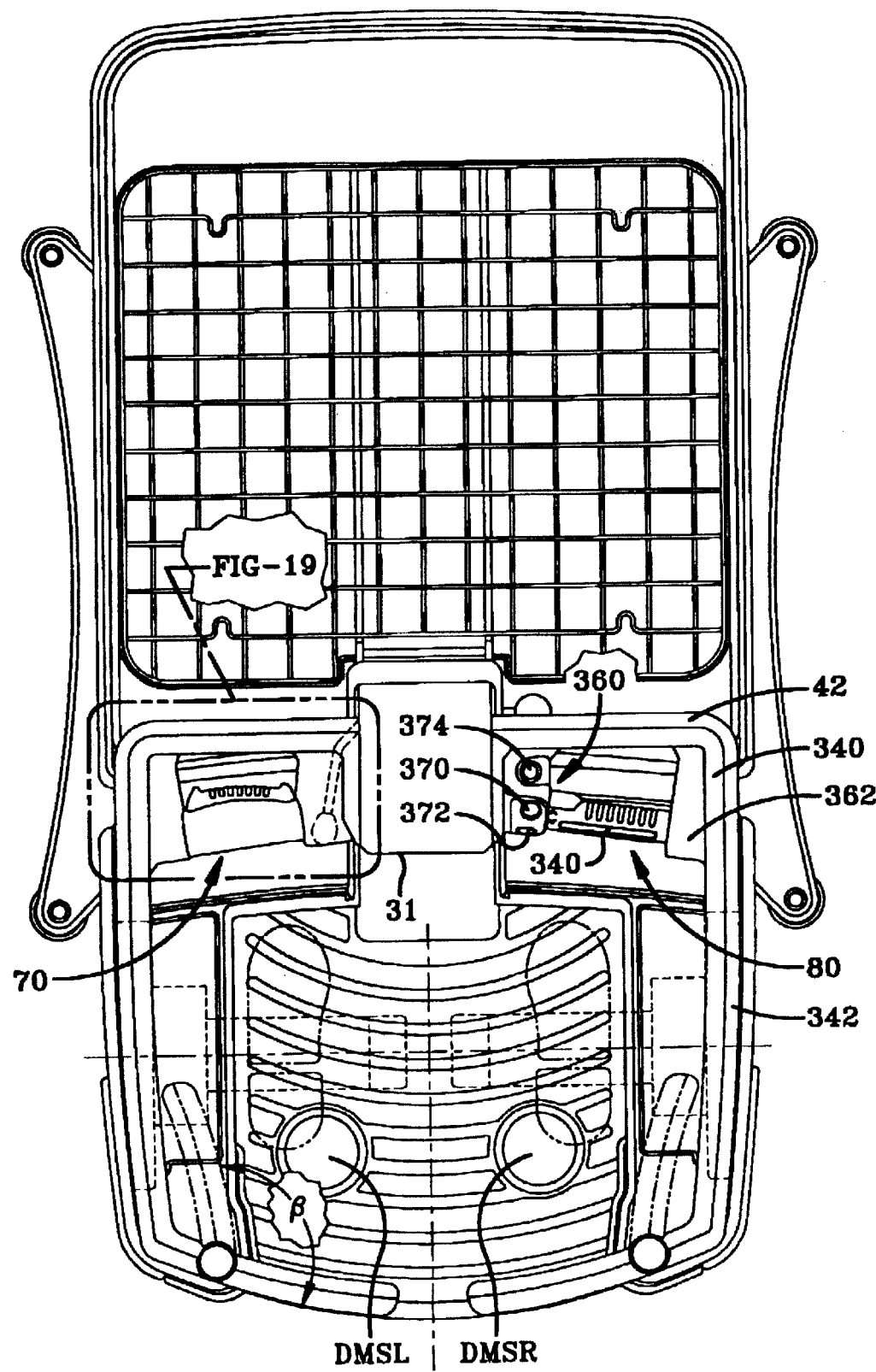
FIG. 11 is a plan view of the vehicle of FIG. 1.

The gate mechanism will be described in connection with FIGS. 6, 11–14. The gates 43, 44 are shown closed in FIG. 6, with the top sections 230 of the gates forming a continuation of the horizontal rail 42. The vertical components 232 of the gates extend vertically downwardly and then taper outwardly to hinge mechanism 47, 48 associated with the floor component 41 of the operator's compartment 40. In FIG. 11, which is a plan view of the operator's compartment, the gates are shown closed in solid line, and open in dotted line, moving from one stable position to the other position through angle β.

As may be seen from FIGS. 3 and 5, with the gates closed, an operator standing within the operator's compartment 40 has free access 360° around the top of the rail 42, and associated gate components, and has free access to the front, sides and rear below the rail, except for the mast 30 at the forward part of the compartment, and the vertical gate sections 232 at the rear of the compartment.

Figure 14:
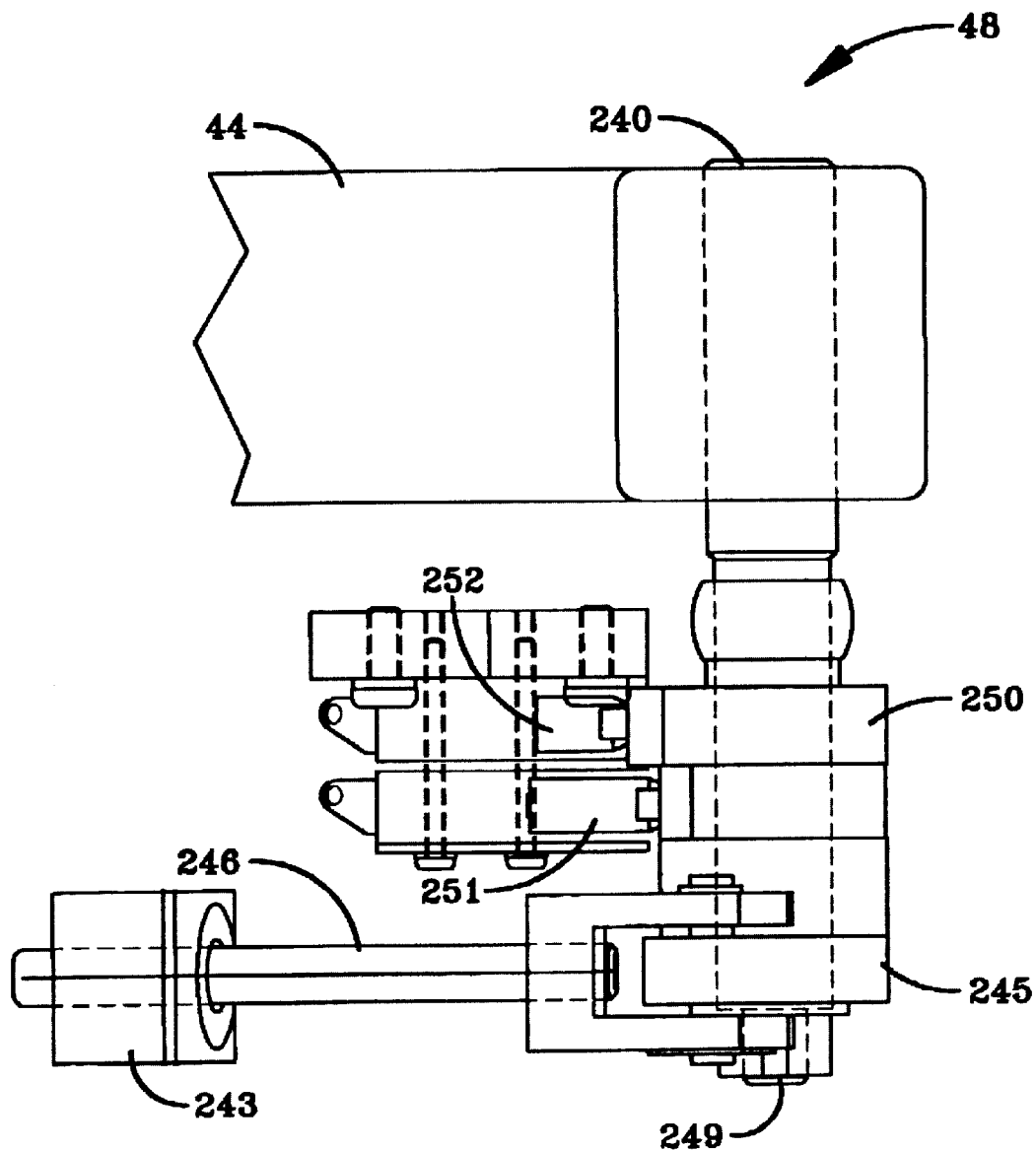
FIG. 14 is a side elevational view of the gate mechanism.

The gates are spring biased to an open or closed position by the mechanism shown in FIGS. 12–14, which show in detail the hinge mechanism 48. This mechanism includes a vertical shaft 240 which is the bottom pivot member for the gate. The bottom portion of the shaft is supported in a bearing 242 mounted on a bracket (not shown). A lever arm 245 is rigidly attached to the shaft 240 and by a pivot pin 249 to a rod 246 which is surrounded by a spring 247, see FIG. 14. The rod 246 extends through an opening 248 formed in a vertical extension of the bracket 243. The gate may move from a closed position shown in FIG. 12 to an open position shown in FIG. 13. In both positions, the spring 247 biases the gate either open or closed. As described, the gates are independently operable.

A cam 250 is mounted on the shaft 240 and interacts with gate position indicating or interlock switches 251 and 252 to indicate the gate position. The interlock switches 251, 252 are provided on both the gates 43, 44 to restrict or prevent travel under certain conditions. If the platform is below approximately 20 inches, and the gates are open, full travel speed is permitted; if the gates are closed, reduced travel speed will be permitted. Above approximately 20 inches, with the gates open, the vehicle is prevented from traveling and the platform cannot be raised, but the platform can be lowered. Above 20 inches, with the gates closed, reduced travel speed is permitted.

An automatic gate mechanism is shown in FIGS. 16–18b. This mechanism includes a linkage operated by the moving of the platform to bias the gates open or closed. In each case, the gates may be either open or closed against a spring bias regardless of the position of the platform. Thus, the operator may hold open the gate while the platform is raised, or, the gate may be held closed when the platform is lowered. Normally, the platform height determines whether the gate will be open or closed.

Figure 17A:
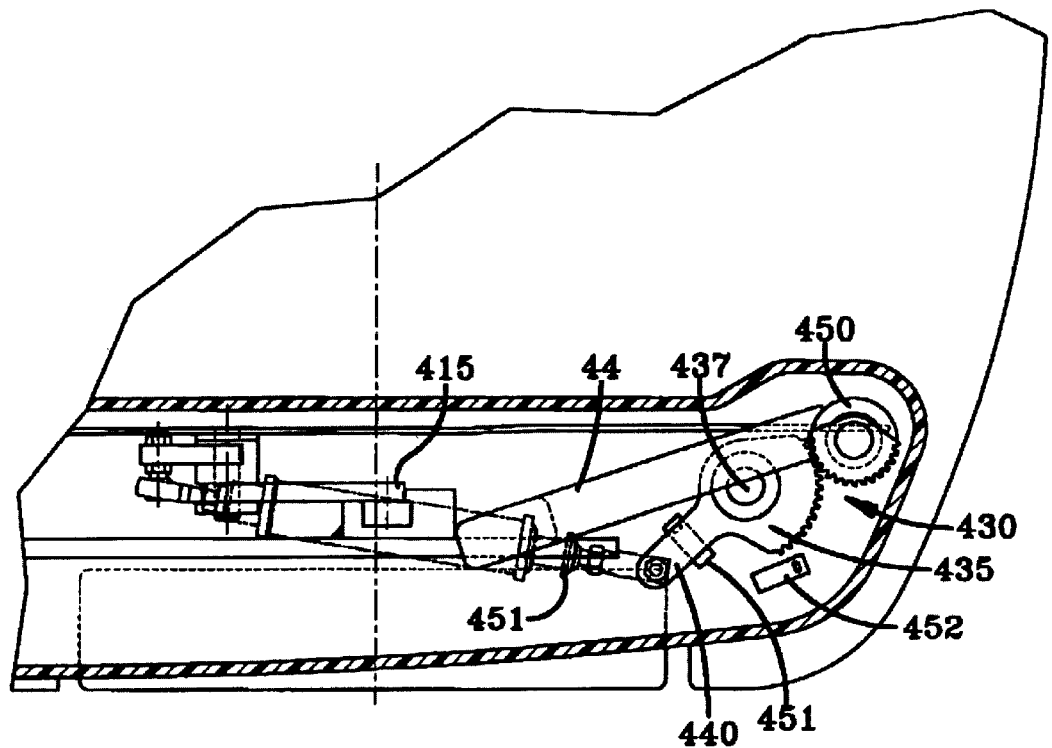
FIG. 17a is a plan view of an automatic gate mechanism with the gate in the open position.
Figure 17B:
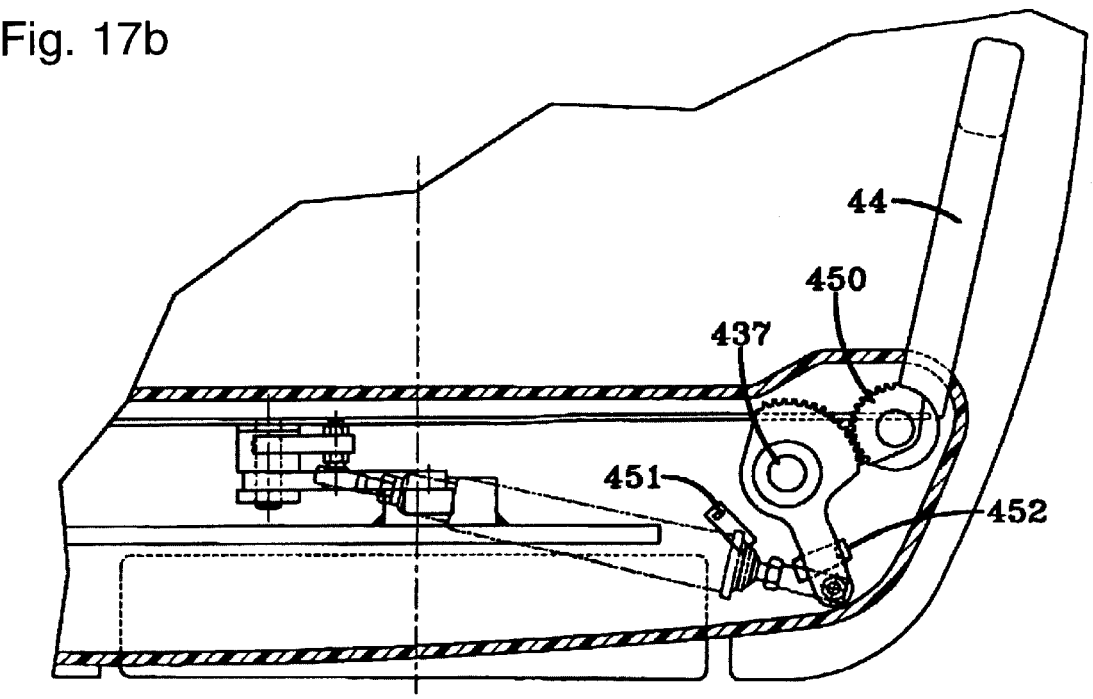
FIG. 17b is a plan view of an automatic gate mechanism with the gate in the closed position.
Figure 18A:
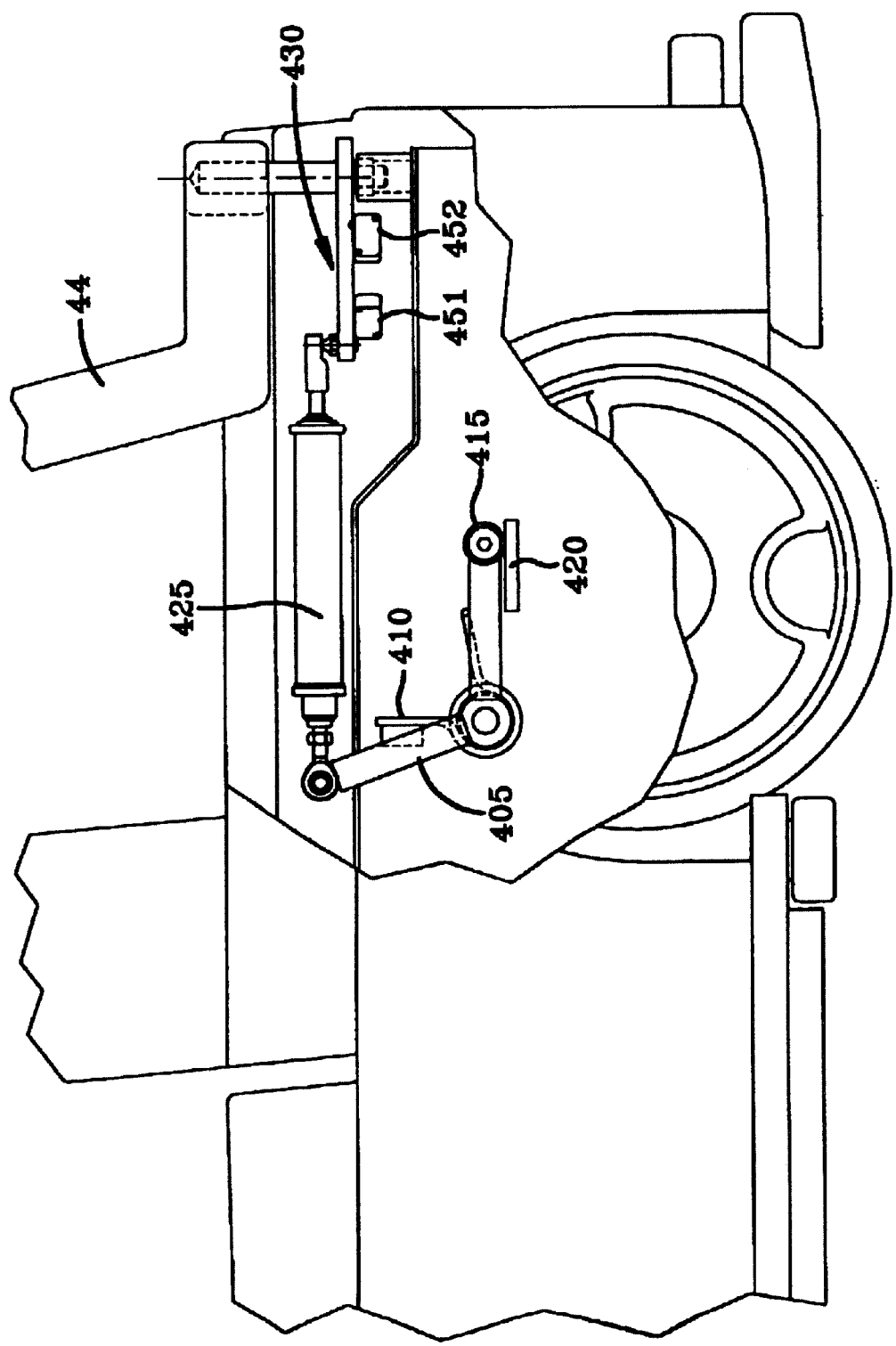
FIG. 18a is a side elevational view of the automatic gate mechanism with the platform in the lowermost position.

FIG. 17a is a plan view of the left rear corner of the operator's platform 40 showing the gate 44 in the open position; in this view, the platform is in its lowermost position, corresponding to FIG. 18a. FIG. 17b is a similar view, but with the gate 44 closed; the platform is in a raised position, corresponding to FIG. 18b. While the left gate 44 will be described, the right hand gate 43 will be operated in the same manner.

The automatic gate mechanism 400 includes a lever arm 405 pivotally mounted to the operator's platform 40 at 407. A torsion spring 410 urges the arm in the clockwise direction, as viewed in FIGS. 18a and 18b. The lower end 412 of the arm is provided with a roller 415 which engages a plate 420 mounted on the body 20; the other end 422 of the arm 405 is connected to a spring assembly 425 which includes a spring 427 mounted within a cylindrical sleeve 430. The spring may be extended or stretched, but the sleeve prevents the spring from being compressed more than is shown in the drawings. The spring 427 is attached to a gate moving mechanism 430, which includes a member 435 rotatable about an axis 437; the member 435 is essentially a gear that is provided with an outwardly extending arm 440 which is attached to the spring 427. The gate 44 is also provided with a gear 450 which meshes with gear portion of member 435.

Referring to FIGS. 17a and 18a, with the operator's platform down, the gate 44 will be in the open position as shown. This is accomplished by the roller 415 engages the plate 420, rotating the lever arm 405 to the position shown, causing the spring assembly 425 to pull on the arm 440 and thus open the gate. Should the operator desire to close the gate, the gate may be rotated clockwise causing the arm 405 to be rotated counterclockwise, and the spring 427 will be extended. The gate must be held closed.

Figure 18B:
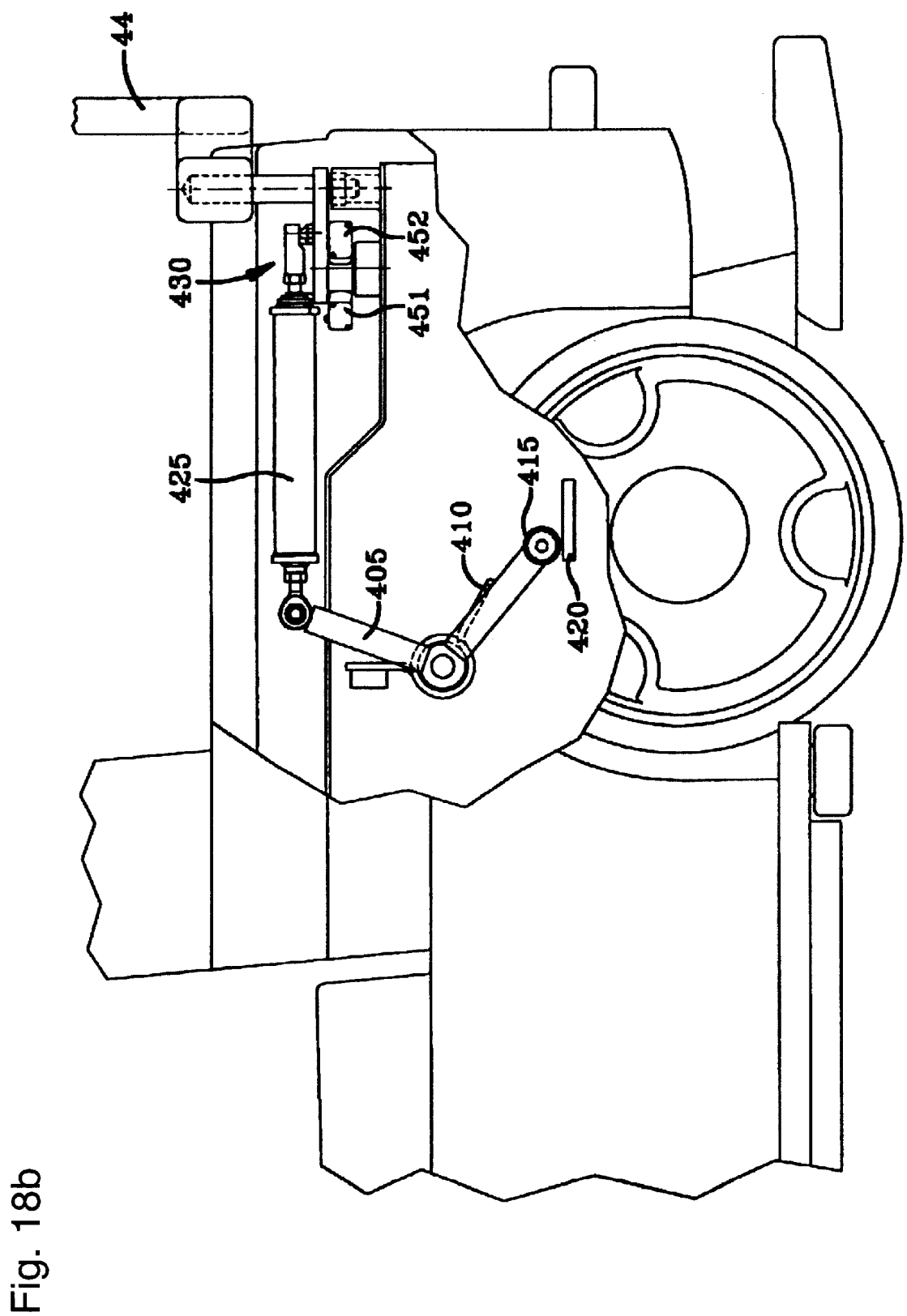
FIG. 18b is a side elevational view of the automatic gate mechanism with the platform in it raised position.

In FIGS. 17b and 18b, the operator's platform is in the raised position. Torsion spring 410 causes the lever arm 405 to rotate clockwise from the position shown in FIG. 18a, moving the spring assembly 425 to the right, and rotating the member 435 counterclockwise, closing the gate. As the platform continues to raise, the plate 420 will be separated from the lever arm 405; however, the lever arm 405 will not rotate further because the gate is now closed. The operator may open the gate by rotating it counterclockwise against the spring tension provided by torsion spring 410. The automatic gate mechanism is provided with gate position sensing switches 451 and 452 for indicating whether the gate is open or closed.

Figure 19:
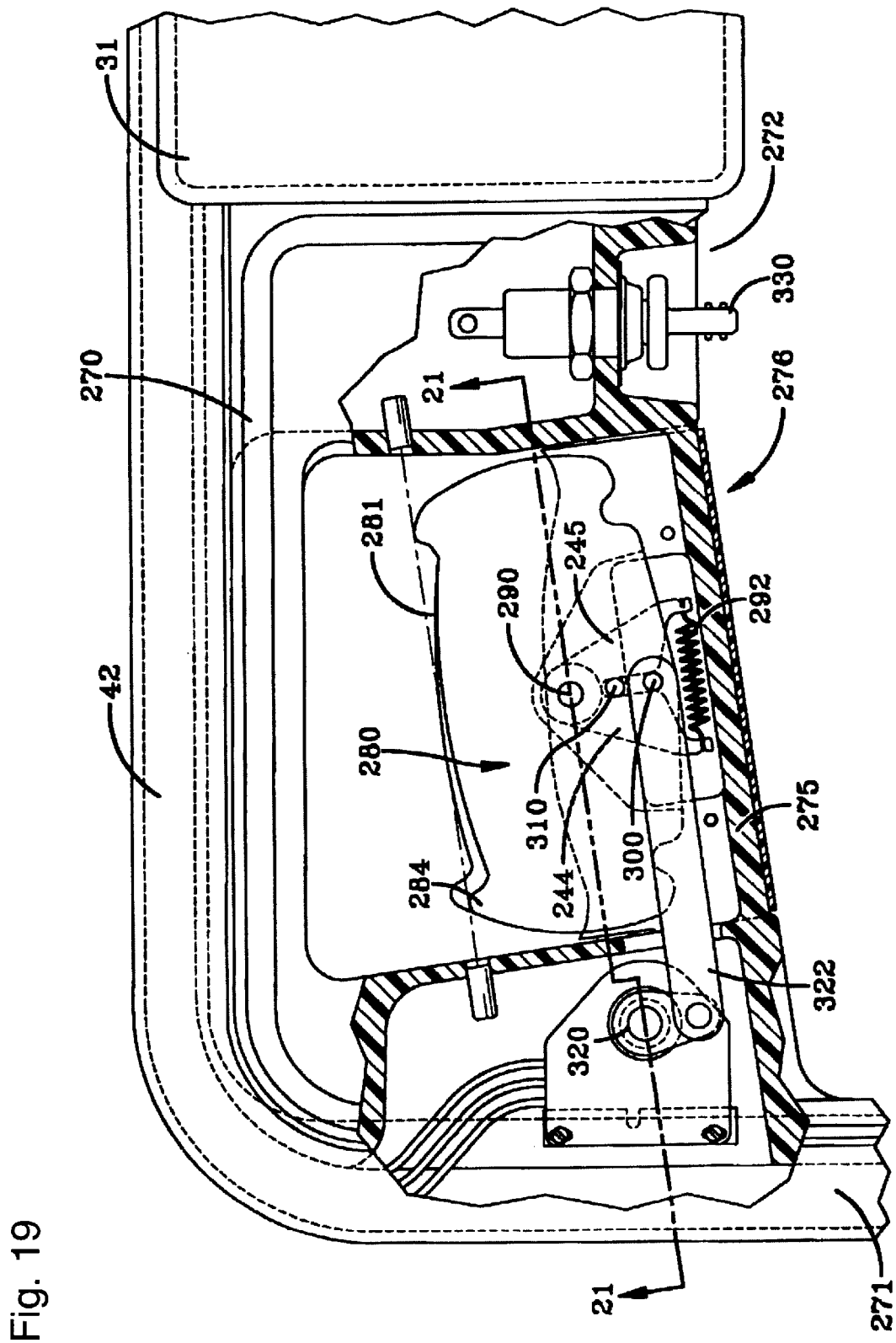
FIG. 19 is a detailed cross sectional plan view of the steering control handle with the handle in its neutral position.
Figure 20:
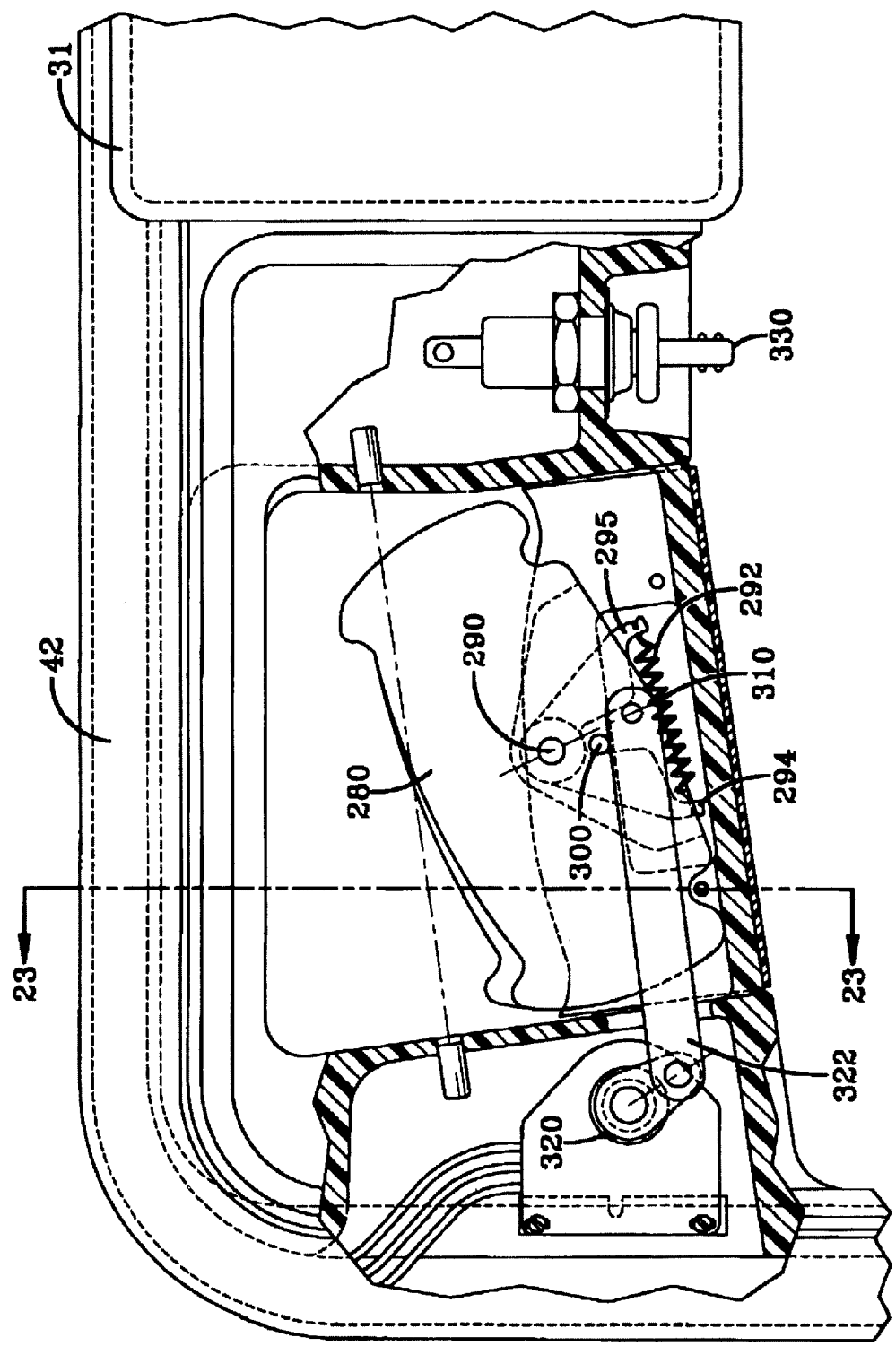
FIG. 20 is a detailed cross sectional plan view of the steering control handle with the handle rotated to the left.

The steering control assembly 70 for the personnel carrying vehicle is shown in FIGS. 2, 19 and 20. The steering control assembly includes a U-shaped member 270 which conforms to the shape of the rail member 42 and is attached to the rail member at 271 and to the mast section 31 at 272, as shown in FIG. 19. An interior bar 275 extends across the open end of the U-shaped member 270 at an angle γ of approximately 82° relative to the longitudinal axis of the vehicle and an angle of approximately 5° relative to the horizontal plane, see FIG. 16. A cover 276 is positioned over the central portion of the bar 275 to form a fixed grip or handle arranged generally horizontally for receiving the left hand of an operator with the operator's fingers extending over the top of the grip and the operator's thumb placed below the grip.

Mounted in and extending from the handle in the forward direction for engagement by the operator's fingers is a rocker mechanism 280. As shown, the rocker mechanism has a width approximately the width of the operator's fingers. As shown, the forward edge 281 of the rocker mechanism is curved at 282 and provided with outwardly extending protrusions 284 at the ends thereof. Notches are formed in the central area. This configuration conforms to the shape of a human hand.

Figure 22:
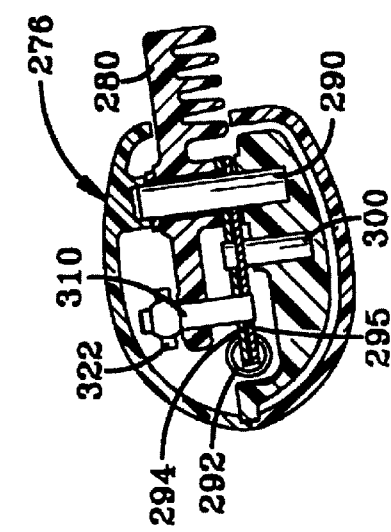
FIG. 22 cross sectional view taken along lines 22—22 of FIG. 21.
Figure 23:
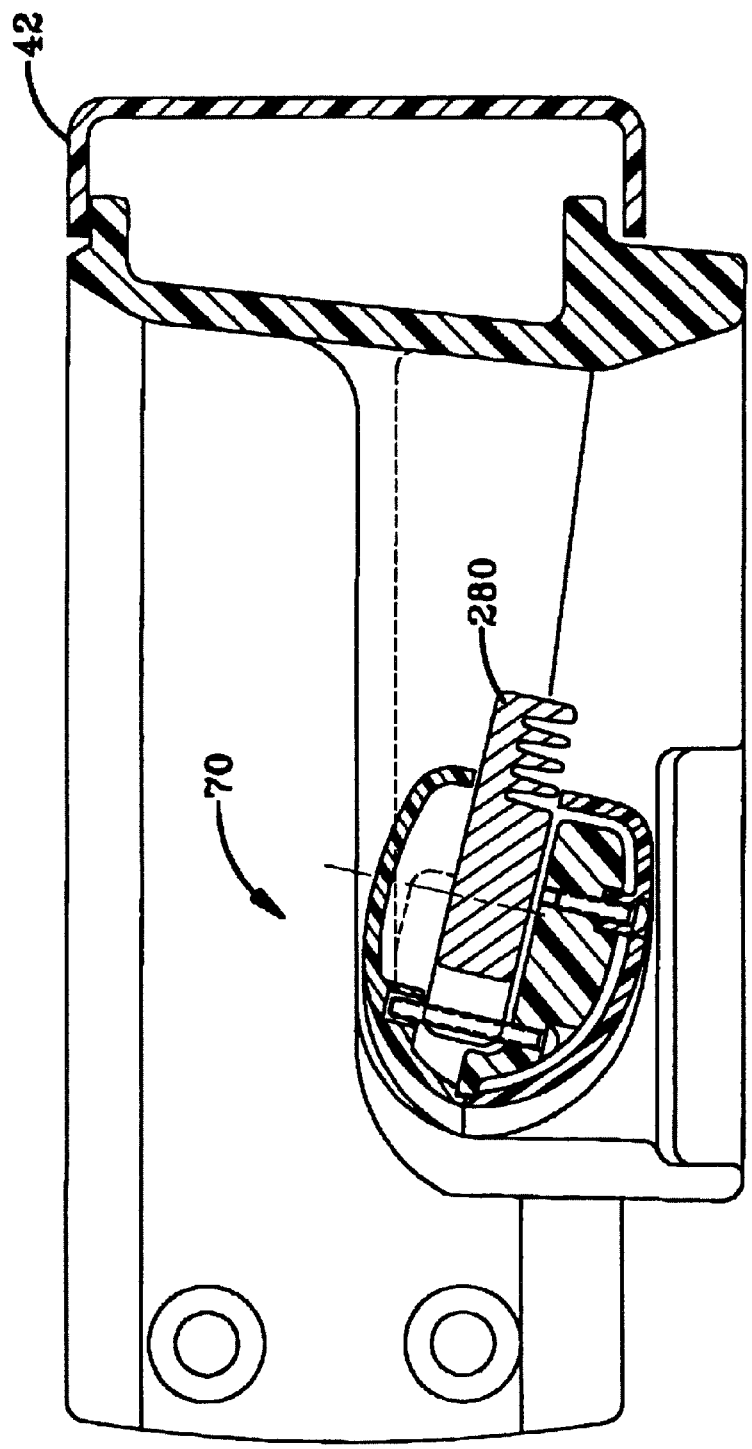
FIG. 23 is a cross sectional view taken along lines 23—23 of FIG. 20.

As shown in FIG. 19, the rocker mechanism 280 is mounted on a pivot 290 which extends upwardly from the bar 275 to permit rotation of the rocker about a generally horizontal plane by the operator's fingers from a neutral or home position to either a clockwise or first position, or a counterclockwise or second position, or any position in between. Biasing means in the form of a spring 292 urges the rocker mechanism to obtain a neutral position, as shown. The spring is attached to the ends of two arms 294, 295 which are free to pivot outwardly about the same pivot 290 as the rocker mechanism. A pin 300 extends upwardly from the bar 275 to prevent the arms from moving inwardly, across the center of the handle. A second pin 310 carried by the rocker mechanism 280 extends downwardly, as shown in FIG. 22 to engage the arms and to move one or the other of the arms outwardly, depending on the action of the operator's fingers.

Figure 21:
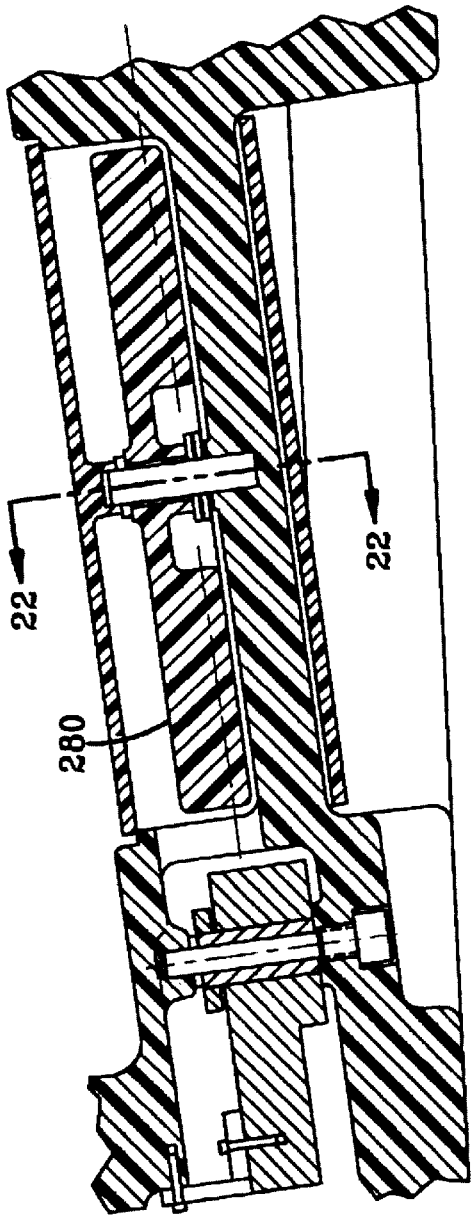
FIG. 21 is a cross sectional elevational view of the steering control handle.

A potentiometer 320 serves as a means responsive to the position of the rocker mechanism for providing an electrical control signal indicating direction of steering. The potentiometer is mounted to the left of the grip, as shown in FIG. 21, and is connected to the rocker mechanism by an actuator arm 322. The pin 310 carried by the rocker mechanism 280 allows attachment of the actuator arm 322 by a tapped hole on one end and a cam 328 attachment to the potentiometer shaft by a tapped hole on the other end.

The potentiometer is electrically connected to a steering control circuit which in turn controls the operation of the traction motors.

A key switch 330 is mounted to the U-shaped member 270. This switch is associated with the vehicle electrical control circuit.

The traction control assembly 80 for the personnel carrying vehicle 10 is shown in FIG. 2. The traction control assembly includes a U-shaped member 340 which conforms to the shape of the rail member 42 and is attached to the rail member at 342 and to the mast section 31 at 343, as shown in FIG. 11. A spring loaded, rotatable handle 350 is mounted between a switch assembly 360 at its left end and a supporting bracket 362 at its right end. A plurality of ridges are provide on the cover of the handle to assist the operator in grasping the handle.

The operation of the traction control handle is conventional as is described in greater detail in U.S. Pat. No. 3,465,841.

The switch assembly 360 also includes push button switches 370, 372, which are used to control the raising and lowering of the operator's compartment 40, a horn button switch 373, an emergency stop button switch 374, and a rabbit/turtle switch 375.

The handle is biased to a center, neutral position but may be rotated in a forward direction to move the vehicle forward at a speed which is a function of the amount of rotation, or it may be rotated to the rear to cause the vehicle to move rearward, also at a speed proportional to the amount of rotation. In the neutral position, or anytime the speed request signal is less than the actual speed of travel, the vehicle control circuit will cause the vehicle to slow using regeneration, that is, causing the traction motors to act as generators and return power to the batteries. Removal of either foot from the dead man switches will cause spring-applied, electrically-released brakes mounted on each traction motor to be applied after a short time delay. Thus, whenever the operator is out of the vehicle, or when either foot is removed from switches DMSL or DMSR, or after the vehicle has been stopped for a predetermined period of time, the brakes are applied.

Figure 15:
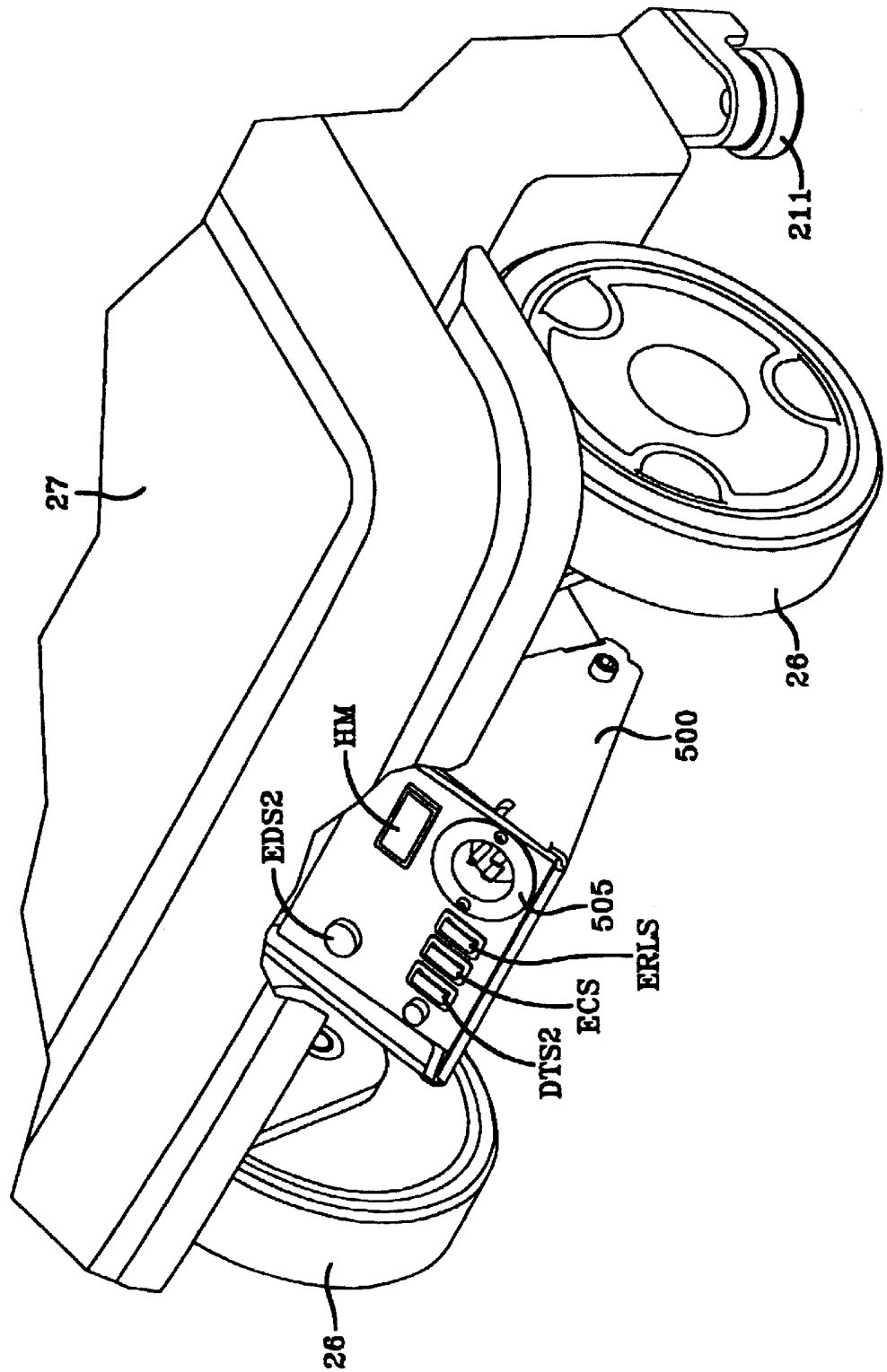
FIG. 15 is a perspective view showing the service panel located at the front of the vehicle.
Figure 16:
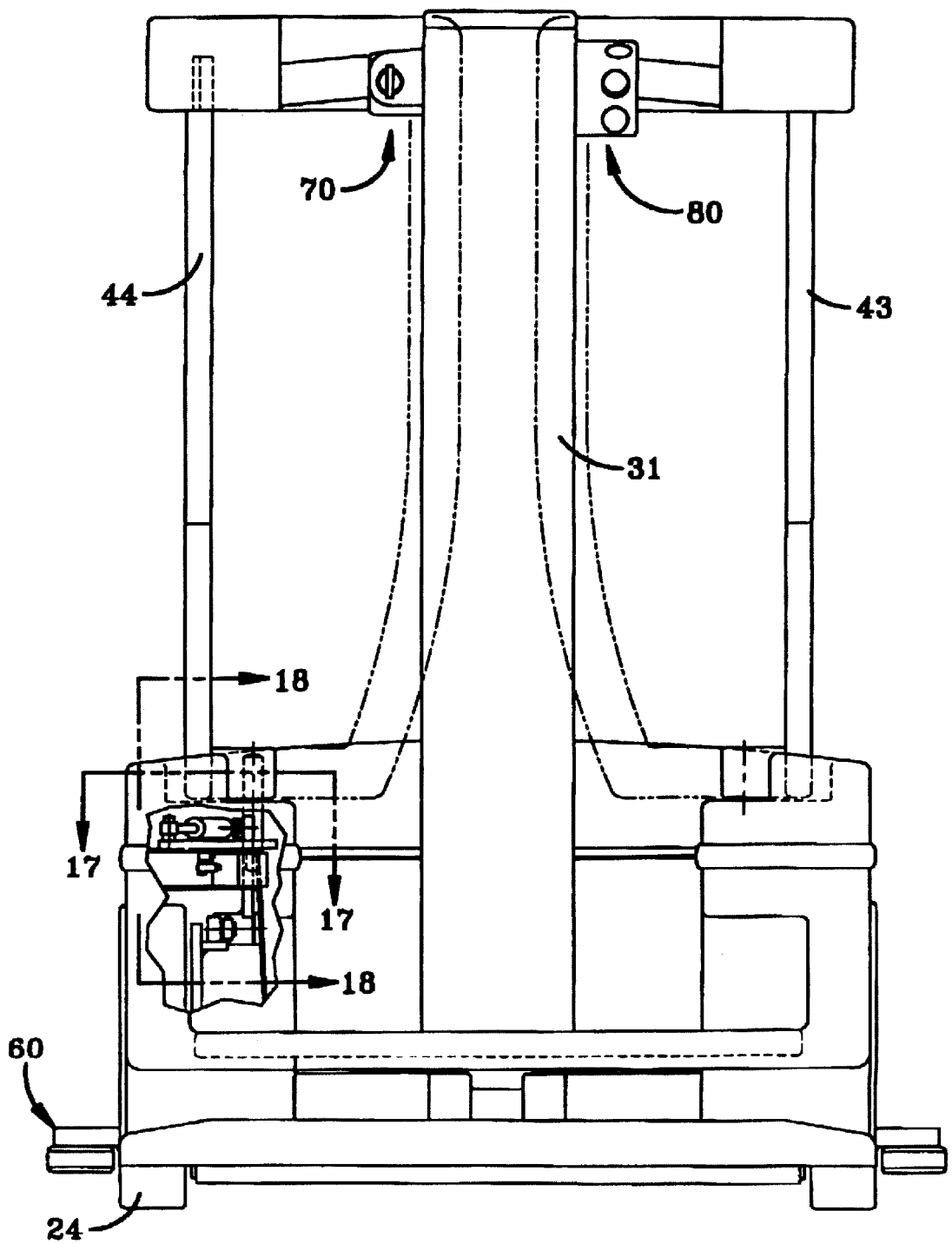
FIG. 16 is an end elevational view, partly cut away to show the gate control mechanism.

FIG. 15 illustrates a service panel 500 mounted at the front of the vehicle. The service panel is designed to be normally closed, but may be opened to the position shown when desired. The service panel includes an electrical connector 505 to permit connection to commercial electrical mains for the purpose of charging the vehicle's internal storage batteries. On the service panel is an hour meter HM and several switches. Switch ERLS is an emergency raise/lower switch used to control the lifting of the operator's platform. Switch ECS is an elevation control switch toggle switch that must be placed in the proper position to permit use of the emergency raise/lower switch. Switch EDS2 is a emergency disconnect switch for removing power from the main contactor to prevent powered travel of the vehicle. Switch DTS1 is a drive-tow switch which releases the electric brakes to permit towing of the vehicle.

Figure 24:
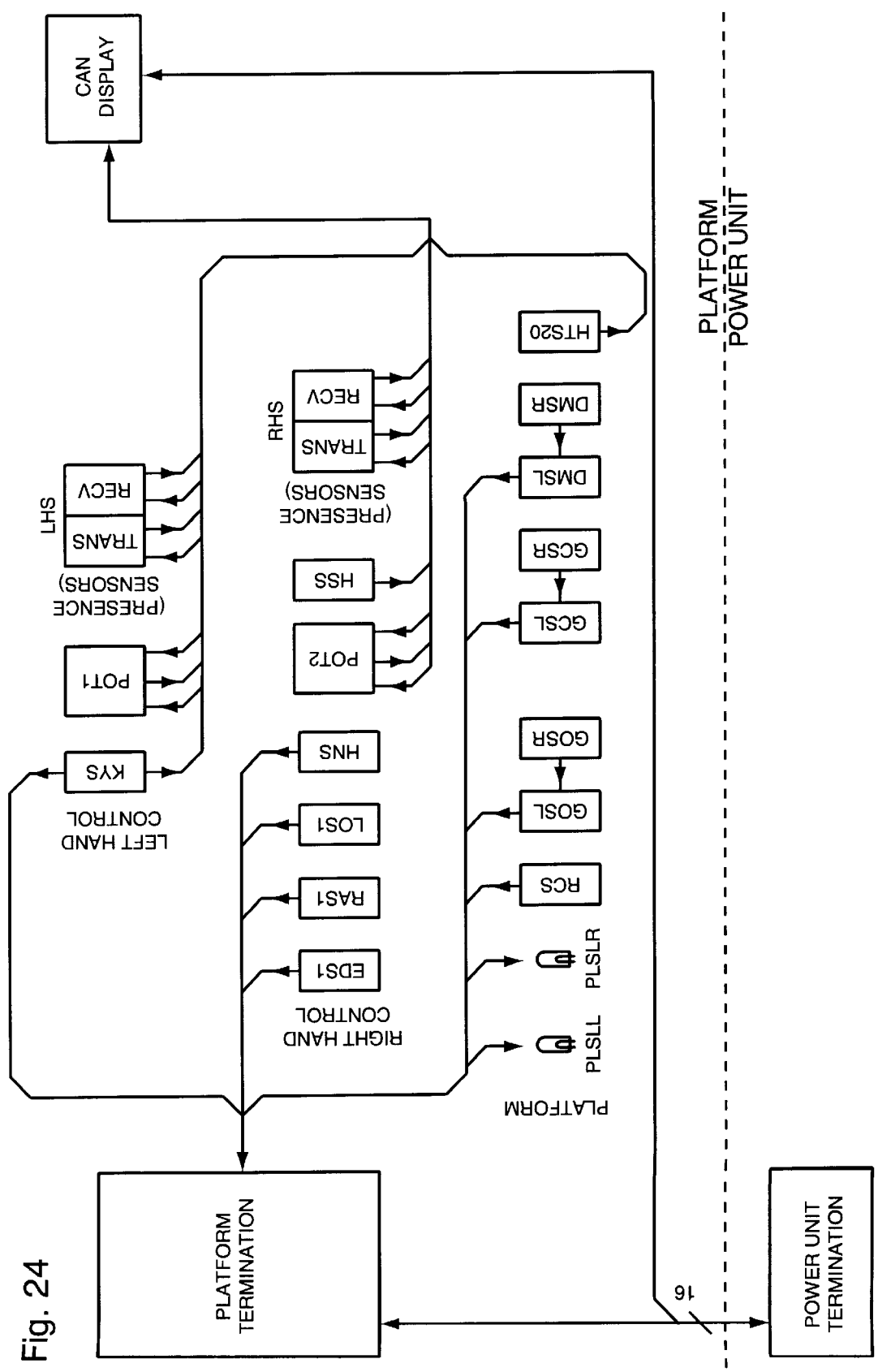
FIG. 24 is a functional electrical block diagram showing the vehicle control circuit on the operator's platform.
Figure 25:
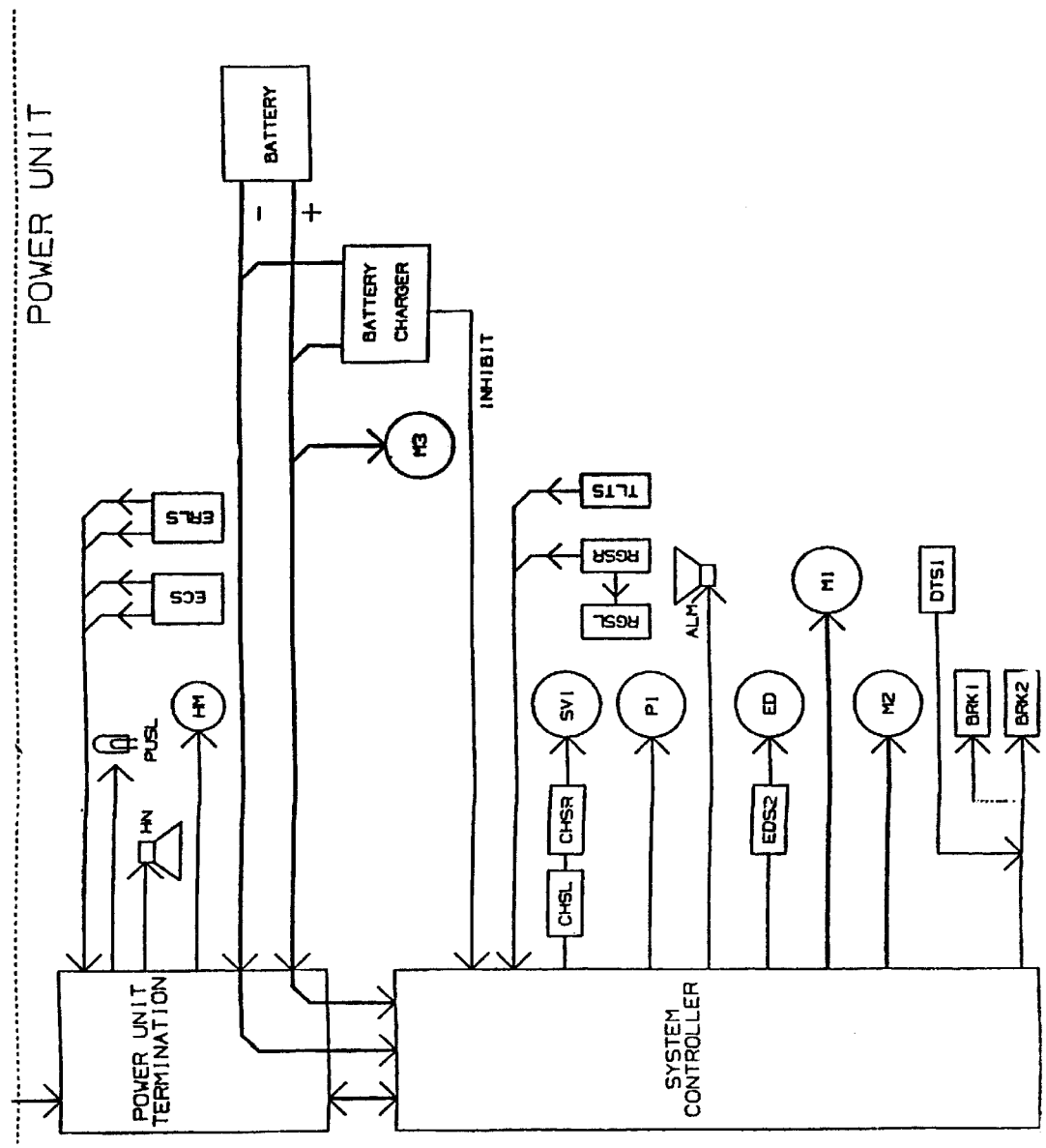
FIG. 25 is a functional electrical block diagram showing the vehicle control circuit on the vehicle or power unit.

Referring to FIGS. 24 and 25 which together comprise a functional electrical block diagram of the vehicle, there are two major components, namely the electrical components associated with the operator's compartment 40, also called the platform in FIG. 24, and those components associated with the power unit or body 20, shown in FIG. 25.

With regard to FIG. 24, electrical components are located in three primary areas: those associated with the steering control; those associated with the traction control; and those associated with the operator's compartment.

With regard to the left hand control components, KYS is a key switch used to authorize operation of the vehicle; LHS and RHS represents left and right hand sensors, optical sensors which determine the presence of the operator's hands; POT1 is the potentiometer 320 associated with the steering control assembly 70; DISP represents a display device located in an area near the steering control, an LED display device visible to the operator.

Turning now to the right hand control components, EDS1 is an emergency disconnect switch typically a red switch with a lightning bolt on it, switch 374 shown in FIG. 11; RAS1 is raise switch 370 and LOS1 is lower switch 372 (FIG. 11); HSS is a high speed switch 375 for controlling the performance level of the vehicle, sometimes known as a rabbit/turtle control; POT2 is a potentiometer in the traction control mechanism 340; HNS is the horn switch 373.

With regard to the operator's compartment or platform components, RCS is a raise cutout switch, also known as a height control switch which controls the upper limit to which the mast can be raised, a switch located on the mast; GOSL is gate open switch left and GOSR is gate open switch right, corresponding to switches 251, 252 (FIG. 12) or 451, 452 (FIG. 18); GCSL is gate close switch left and GCSR is gate close switch right, these switches will control the speed of the vehicle and the ability to raise the platform, depending on whether the gate is open or closed and whether the platform is raised on not; HTS20 is a height sensing switch which is used in conjunction with the gate switches to control the speed curve; DMSL and DMSR are a floor mounted dead man switches, left and right. All of the platform components are terminated in terminal block PTB, which in turn is connected to a pair of cables that are connected to the power unit.

The power unit components are shown in FIG. 25 and include: ERLS, an emergency raise/lower switch; ECS, and elevation control switch toggle switch that must be used in conjunction with ERLS; CHSR and CHSL are chain slack switches, right and left, conventional switches which prevent the continued lowering of the operator's compartment in the event an obstacle is encountered; HN is the horn; SV1 is a solenoid valve which, when energize allows the operator's compartment or platform to lower by permitting hydraulic fluid to return to its reservoir; HM is an hour meter; M3 is a motor for driving the hydraulic lift pump; battery B is typically a set of four batteries providing a 24 volt output; a battery charger BC is also provided and may be connected to commercial mains through a connector 505 in the service panel; TLTS is a two axis tilt sensor to prevent raising of the platform in the event it becomes tilted beyond predetermined limits; RGSL and RGSR are rail guide switches, left and right which may be used to control the speed curve of the vehicle, depending on whether it is located between guide rails; P1 is the hydraulic pump contractor; ALM is a warning alarm; EDS2 is a second emergency disconnect switch; ED is an emergency disconnect contractor; M1 and M2 are the traction motors; DTS1 is a drive tow switch which removes most of the power to the vehicle but which releases the electric brakes; BRK1 and BRK1 are electric brakes on the traction motors. The components of the power unit are terminated either in the power unit termination block PUT or the system controller 600. The system controller 600 is a microprocessor for controlling braking, traction and steering. The platform terminal block PTB is connected to the power unit termination block PUT by means of a multi-conductor cable 610.

While the form of apparatus herein described constitutes a preferred embodiment of this invention, it is to be understood that the invention is not limited to this precise form of apparatus and that changes may be made therein without departing from the scope of the invention, which is defined in the appended claims.

What is claimed is:

1. Apparatus for guiding a personnel carrying vehicle into a narrow aisle, said vehicle including a body provided with a pair of driven rear wheels and a pair of front caster wheels, said apparatus comprising:

a pair of rollers mounted on each side of said vehicle and spaced between said front caster wheels and said rear driven wheels;

a steering rail extending between said pair of rollers on each side of said vehicle, wherein each of said steering rails is curved inwardly towards said body; and a guide rail placed on each side of said aisle for engaging said vehicle mounted rollers, said guide rails terminating in entry ends which engage said steering rails for entry of said vehicle into said narrow aisle.

2. The apparatus of claim 1 further comprising an aisle roller placed at said entry ends of said guide rails for engaging said vehicle mounted steering rails.

3. A method of guiding a vehicle into a narrow aisle wherein said vehicle includes a pair of driven rear wheels and a pair of front caster wheels, said method comprising the steps of:

mounting a pair of guide rollers comprising a forward guide roller and a rear guide roller on each side of said vehicle between said front and rear wheels;

mounting a steering rail on each side of said vehicle between said forward and rear guide rollers;

providing said aisle with a guide rail on each side thereof and extending along the length of said aisle, said guide rails defining aisle entry ends;

steering said vehicle forward toward an aisle entrance to cause one of said forward guide rollers to engage one of said guide rails and one of said aisle entry ends to engage one of said steering rails; and continuing forward movement of said vehicle to cause said vehicle to rotate about said engaged aisle entry end to align said vehicle within said aisle.

4. The method of claim 3 further comprising the step of placing an aisle roller at each of said aisle entry ends of said guide rails for engaging said vehicle mounted steering rails.

* * * * *